United States Patent
Buerner et al.

(10) Patent No.: US 11,297,799 B2
(45) Date of Patent: Apr. 12, 2022

(54) ORGANISM TRACKING AND INFORMATION SYSTEM

(71) Applicant: Allaquaria, LLC, Los Angeles, CA (US)

(72) Inventors: G. Christopher Buerner, Palos Verdes Estates, CA (US); Kurt A. Soderberg, Beverly Hills, CA (US)

(73) Assignee: ALLAQUARIA, LLC, Los Angeles, CA (US)

( * ) Notice: Subject to any disclaimer, the term of this patent is extended or adjusted under 35 U.S.C. 154(b) by 7 days.

(21) Appl. No.: 13/657,672

(22) Filed: Oct. 22, 2012

(65) Prior Publication Data
US 2014/0115011 A1    Apr. 24, 2014

(51) Int. Cl.
*A01K 27/00*    (2006.01)
*A01K 11/00*    (2006.01)
*G06Q 30/02*    (2012.01)

(52) U.S. Cl.
CPC .......... *A01K 11/006* (2013.01); *A01K 11/008* (2013.01); *G06Q 30/0201* (2013.01)

(58) Field of Classification Search
CPC . A01K 11/006; A01K 11/008; G06Q 30/0201
See application file for complete search history.

(56) References Cited

U.S. PATENT DOCUMENTS

| | | | |
|---|---|---|---|
| 5,478,990 A | 12/1995 | Montanari et al. | |
| 5,751,246 A * | 5/1998 | Hertel | B60R 25/04 340/539.13 |
| 6,091,956 A * | 7/2000 | Hollenberg | 455/456.5 |
| 8,682,888 B2 * | 3/2014 | Smith | 707/724 |
| 8,693,778 B1 * | 4/2014 | Landwehr et al. | 382/170 |
| 2003/0014342 A1 * | 1/2003 | Vande Pol | G06Q 90/00 705/36 R |
| 2003/0028914 A1 * | 2/2003 | Liu et al. | 800/278 |
| 2003/0062001 A1 * | 4/2003 | Andersson | A01K 11/008 119/174 |
| 2003/0148359 A1 * | 8/2003 | Moczydlowski et al. | 435/6 |
| 2003/0172394 A1 * | 9/2003 | Holzer et al. | 800/21 |
| 2005/0051109 A1 * | 3/2005 | Fantin | A01K 11/003 119/721 |
| 2005/0108056 A1 * | 5/2005 | Sachdev | G16H 10/65 705/3 |

(Continued)

*Primary Examiner* — Tarek Chbouki
(74) *Attorney, Agent, or Firm* — K&L Gates LLP

(57) ABSTRACT

Source data associated with an ornamental organism is obtained and stored in a unique account/location in an ornamental organism database. Each unique account/location is then assigned a unique access path. A unique information access device, such as a sticker or tag, is then generated that includes a unique account access symbol or code that is a representation of the unique access path data. The unique information access device is then included with the specific ornamental organism, or lot of ornamental organisms, at each level of the distribution and sales chain. Then, whenever the unique account access symbol or code is scanned, the unique access path data is obtained and used to access the unique account/location that is associated with specific ornamental organism, or lot of ornamental organisms, and includes the source data for the specific ornamental organism, or lot of ornamental organisms.

34 Claims, 4 Drawing Sheets

(56) References Cited

U.S. PATENT DOCUMENTS

| | | | |
|---|---|---|---|
| 2006/0054092 A1* | 3/2006 | Valencia | A01K 29/00 119/51.02 |
| 2006/0201432 A1* | 9/2006 | Pratt | G06Q 50/02 119/51.02 |
| 2007/0103314 A1 | 5/2007 | Geissler | |
| 2007/0208591 A1* | 9/2007 | Glenn et al. | 705/1 |
| 2008/0163824 A1* | 7/2008 | Moser | G16B 20/00 119/174 |
| 2008/0178819 A1* | 7/2008 | Sia et al. | 119/300 |
| 2009/0229530 A1 | 9/2009 | Pratt | |
| 2009/0231110 A1* | 9/2009 | Hyde et al. | 340/10.41 |
| 2010/0109903 A1* | 5/2010 | Carrick | 340/825.49 |
| 2010/0139572 A1* | 6/2010 | Sia et al. | 119/346 |
| 2011/0010971 A1* | 1/2011 | Erickson | G09F 3/0297 40/300 |
| 2011/0088295 A1* | 4/2011 | Ibsen et al. | 40/301 |
| 2012/0161964 A1* | 6/2012 | Rettedal | G16H 10/60 340/539.13 |
| 2012/0166322 A1 | 6/2012 | Simon | |
| 2012/0255501 A1* | 10/2012 | Sia et al. | 119/437 |
| 2012/0323911 A1* | 12/2012 | Anton et al. | 707/736 |
| 2013/0016214 A1* | 1/2013 | Dlott et al. | 348/143 |
| 2013/0054011 A1* | 2/2013 | Holman et al. | 700/232 |
| 2013/0290013 A1* | 10/2013 | Forrester | G16H 10/65 705/2 |
| 2020/0015040 A1* | 1/2020 | Baird | H04W 4/021 |

\* cited by examiner

ORGANISM TRACKING AND INFORMATION SYSTEM

BACKGROUND

The American Pet Products Association (APPA) reports that, in 2009, 62% of American households owned pets; that equates to about 71.4 million households. The breakdown of pet owning households was reported as, 45.6 million owning dogs, 38.2 million owning cats, 14 million owning fish, 6 million owning birds, 4.7 million owning reptiles, 5.3 owning other small animals, and 3.9 million owning horses. It was further reported that 2.21 billion dollars were spent purchasing new pets in 2009.

As noted, the statistics above represent only American households. The figures are presumably even greater when pet owning households throughout the world are considered. Clearly, the pet industry is a significant force worldwide. As a result of these numbers, business practices implemented by the pet industry can have a significant impact on not only pet buying consumers and the specific animals involved, but also on the ecosystems that are the source of the animals.

Traditionally domesticated animals such as dogs, cats, and horses have well established source tracing systems, such as pedigree and other source data distribution systems. However, ignoring for the moment these traditionally domesticated animals, there are still at least 30 million households in the United States alone that own smaller, less traditional, pets. These non-traditional, and not as well tracked/documented, pets include, but are not limited to, fresh and saltwater fish, reptiles, amphibians, birds, corals, invertebrates, plants, and various other "ornamental" animals/pets and organisms. Herein, the terms "ornamental animal" and "ornamental organism" are used interchangeably and include animals, corals, plants, invertebrates, etc. that are purchased by consumers primarily for use as pets, and/or for display.

Many ornamental organisms are imported from source regions that are physically far removed from the household's they come to inhabit. However, as noted, there is currently relatively little documentation/source tracking associated with the origin of many, non-traditional, ornamental organisms, at least on an individual/specific animal basis. In addition, what little source data is available is typically not provided to anyone in the supply chain beyond the wholesale distributors or, at best, the retailers selling the ornamental organisms.

This fact presents several unique issues for all the parties in the ornamental organism distribution and sales chain, e.g., the producers and/or collectors/sources of the ornamental organisms, the wholesale distributors of ornamental organisms, the retailers selling the ornamental organisms, and the consumers that eventually purchase the ornamental organisms and keep them as pets. For instance, despite the current lack of source information, all parties the in ornamental organism distribution chain would be benefited by having access to the source information associated with each animal, such as where the specific animal came from, i.e., the specific animal's collector and provider, producers, breeders, aqua-culturists, mari-culturists, collectors, wholesale distributors and/or the specific animal's country/region of origin, and the supply chain associated with each specific ornamental organism.

Herein, the terms "collector", "provider" and "producer" of ornamental organisms include, but are not limited to, parties trapping, catching, collecting, breeding, or otherwise making available ornamental organisms. For instance, a "collector", "provider" and/or "producer" can be, but are not limited to, parties that gather organisms from the wild, breeders of organisms, aqua-culturists, mari-culturalists, and various other parties that obtain and provide ornamental organisms by any method, means, mechanism, process or procedure, as discussed herein, and/or as known in the art at the time of filing, and/or are developed after the time of filing.

Clearly this source information would be highly useful to wholesale distributors of ornamental organisms. For example, using detailed source data, the wholesale distributor could ensure the importation, and eventual sale of an ornamental organism, is legal under both the exporting county's and importing country's laws and/or that the requirements of various standards and certification agencies are met; indeed most of what little source data currently exists, exists in order to show the animals conform with these laws and/or standards.

Using detailed source data, the wholesale distributor could also watch for, track, and control any regional disease and parasites associated with the ornamental organism, and/or the ornamental organism's source region. In addition, using detailed source data the wholesale distributor could also collect data regarding the reputation and quality of a given collector, source, and regional provider of the ornamental organism, i.e., the wholesale distributor could track how well animals from a given source faired once in captivity and in the distribution chain. In short, using detailed source data, the wholesale distributor could more carefully track and manage their ornamental organism acquisition, distribution and inventory system.

In addition, wholesale distributors could provide detailed source data, such husbandry data indicating the care, feeding, quarantine periods, etc. provided the ornamental organisms.

Currently, some wholesale distributors of ornamental organisms do have access to at least some source data for the ornamental organisms they provide; if for no other reason than by virtue of the fact that the wholesale distributor has at least had some form of contact with the collector/supplier of the ornamental organisms. However, currently, source data obtained by wholesale distributors is often minimal and is, more often than not, collected/obtained in a non-systematic manner that represents the least effort required to meet any exportation/importation laws, and/or certification standards, associated with the animals.

In addition, any source data obtained by the wholesale distributor is currently typically kept by the wholesale distributor and is not passed onto retailers, much less to consumers. The current lack of source data collection and distribution is not so much the result a conscious policy or lack of effort on the part of wholesale distributors as it is a result of the current lack of an efficient and simple means for distributing the source data associated with each of the literally tens of millions of ornamental organisms sold each year.

One major obstacle to distributing the source data associated with each ornamental organism is the fact many of these animals cannot be collared or tagged in any safe, humane, or practical manner. For instance, a tropical fish clearly can't wear a collar or a tag on its body, and many ornamental organisms are too small to safely have any electronic devices, such as ID chips, inserted. In fact, currently, no attempt is typically made to provide any detailed source data, beyond the minimum data required to import and sell the animals, for any but the largest, and/or most expensive, ornamental organisms.

In addition, even in the case of expensive ornamental organisms, there is often still no mechanism for directly linking a specific, i.e., individual, ornamental organism with its source information/data. In some cases, typically cases of larger expensive ornamental organisms, Radio Frequency IDentification (RFID) devices are used. However, this process typically requires specialized readers/scanners to obtain any information from the RFID device. Consequently, RFID is expensive and prone to errors/malfunction in many ornamental organism environments, such as salt water. As a result, RFID tagging is typically only available/practical in a limited number of situations and is completely inappropriate for smaller, and/or relatively inexpensive, ornamental organisms.

The current lack of source data also adversely affects retailers selling the ornamental organisms. Indeed, most retailers selling the ornamental organisms would be benefited by knowing source data associated with the ornamental organisms for the same reasons discussed above with respect to wholesale distributors. In addition, the retailers could use the source data to prove they sell ornamental organisms only from collectors/providers, and/or countries/regions of origin, that meet desired standards and certifications such as humane and sustainable animal capturing methods, humane and healthy animal handling procedures, humane and healthy animal transportation practices, and humane husbandry provided to the ornamental organisms. These practices not only ensure the long-term health/life span of the ornamental organisms, but they are also politically sensitive, and of concern to a growing number of consumers.

For instance, a given retailer may want to ensure that the ornamental organisms they sell come from a collector, and/or region, known to practice sustainable collection rates and humane animal trapping procedures. Once obtained, the retailer can then use this source information to buy only animals that come from the sources that meet these criteria. As a result, the retailer can more effectively market the ornamental organisms to a larger, more sensitive, consumer base.

The consumer who eventually purchases the ornamental organisms would also benefit from the source data for many of the same reasons discussed above, e.g., the end consumer can ensure all laws/certifications/standards are complied with, that the animal was caught and/or transported in a humane and healthy manner, that the animal comes from a sustainable source, and that the animal was treated in such a way as to ensure maximum health and life span. In addition, the consumer may also desire ornamental organisms from a specific region or source for collection and environment consistency reasons. In these instances, accurate and detailed source data must be available to meet the consumer's needs.

For example, a collector of tropical fish may be trying to create an aquarium that is representative of the environment found in Key West, Fla. In this example, the collector may desire to add an angel fish to the collection. However, angel fish are found throughout the world, and in virtually every ocean. Consequently, for consistency and authenticity of his display, the consumer would want to determine the origin/source of the angel fish to try and ensure he gets one from the Florida Keys, and preferably from Key West. Currently, there is no easy way for the consumer to ensure this fact beyond catching the fish himself in Key West.

In addition, a consumer may want organisms from a given region to limit cross contamination opportunities, i.e., to limit exposing his current pets to disease and parasites they have never encountered from a new source region. For example, the consumer discussed above, may want an angel fish from the Florida Keys not just for accuracy/consistency of the display, but also because the chance of introducing disease and/or parasites that his current fish have not been exposed to, and therefore have no immunity to, is significantly less if the new fish comes from the same region as his current pets.

In addition, a consumer may desire the source data associated with a specific ornamental organism in order to match habitant temperatures, lighting, food, and physical surroundings such as bedding or rock/coral, to the organism's actual region of origin. For instance, as another illustrative example, the California common king snake is a popular ornamental pet. These snakes are found throughout California in habitats ranging from the Mojave Desert to the high Sierra, and from chaparral of the hills surrounding Los Angeles to the coastal plains of Monterey and Big Sur and the deep forests of the far northern regions of California. Consequently, a consumer that desires to provide his pet king snake a habitant matching its source region would need to know where in California the snake was caught.

The need for this source data also goes beyond a mere desire to provide the animal with an aesthetically pleasing and/or more natural new home. Accurate source data can help the consumer/owner determine what temperature ranges the animal needs, how many hours a day the animal should be provided lighting, how much shade to provide, what type of shelter to provide, what substrate to provide, the amount of UV light the animal should be provided, how long the animal should be hibernated, if at all (this is required to mate many reptiles), and numerous other regional variables that should be adjusted to provide the animal a healthy environment and ensure the animal enjoys a long life.

Another reason each party in the ornamental organism distribution chain may desire source information regarding specific ornamental organisms is the desire to ensure that the organisms received desired husbandry and that the organisms come from the shortest possible supply chain, and as directly as possible from their natural habitat. This is because, as a general rule, the shorter the supply chain, the fewer temporary housing arrangements the organism is subjected to, and the fewer the opportunities for the organisms to contact disease, i.e., the less chance for cross contamination. In addition, the shorter the supply chain and the fewer temporary housing arrangements the organism is subjected to, the less chance the organism has undergone, or will undergo, physical and psychological distress.

For the reasons discussed above, and for many other reasons, all the parties in the ornamental organism distribution and sale chain would benefit from having easy access to source data associated with the specific ornamental organism they offer for sale, or are contemplating purchasing, or have purchased. However, currently, there is no easy, efficient, economical, or user friendly mechanism in place for providing each party in the ornamental organism distribution chain source data regarding a specific ornamental organism.

As noted above, this is true for several reasons. First, as noted above, currently, at best, the wholesale distributer has only some of the source data and this information is often collected, and stored, in a disorganized, non-systematic, manner. In addition, what source data is collected is typically not provided to the retail distributer, much less the consumer, at least not on a specific organism, or lot of organisms, basis. As also noted above, the current lack of source data distribution stems in large part from the current inability to physically link the source data for a specific ornamental organism to the specific ornamental organism, i.e., currently there is no efficient and simple means for distributing the source data associated with each of the literally tens of millions of ornamental organisms sold each year.

In addition, even in cases where a retailer is offered, or even provided, source data for ornamental organisms it receives from a wholesale distributor, there is currently no efficient and simple mechanism for organizing and tracking individual organisms and linking those organisms to their specific source data; much less for providing this information to consumers who are contemplating the purchase of a specific organism, or have purchased an organism.

Currently, at best, retail sellers of ornamental organisms provide consumers with generalized fact and care sheets associated with entire species, or even classes of species, of ornamental organisms. These care sheets are static and typically tell a consumer nothing about the actual origin of a specific organism being considered for purchase nor the husbandry applied to the organism. In addition, these care sheets typically provide the consumer with no information regarding the history, region of collection, supply chain, or date of capture associated with a specific organism being considered for purchase. Consequently, currently, consumers typically have no way of determining the actual source, region of origin, treatment history, supply chain, or even length of time in captivity of an ornamental organism they are considering purchasing, or have purchased.

Another issue associated with current ornamental organism distribution and sales is a lack of availability of post-sale information associated with specific ornamental organisms, or even specific species. For instance, currently, there is no simple and efficient mechanism in place for a wholesale distributor of ornamental organisms to obtain data indicating where his organisms eventually are located/housed and how well his organisms faired at those locations. This is because, currently, once the ornamental organisms are provided to the retailer, the only feedback the wholesale distributor is likely to receive is an indication of refunds provided by the retailer. Even this information often lacks any indication of the conditions that led to the request for refund or the return of an organism. In short, currently, there is no communications link between the wholesale distributer, much less the collector/provider/producer of the organisms, and the end consumer. Indeed, in most cases there is not even a communication link between the retailer and the end consumer once a sale is made.

This is an unfortunate situation since all parties in the ornamental organism distribution and sales chain could benefit from post-sale data/information relating how well a given organism did in its eventual home and, what factors may have contributed to how well the organism faired. If this post-sale data/information were readily available it could be used to form future policies and guidelines that would benefit not only the humans involved, but also the organisms.

What is needed is a method and system for providing all parties in the distribution chain associated with a specific ornamental organism access to source data for that specific ornamental organism so that the source data for the specific ornamental organism can be accessed quickly, efficiently, and economically, by virtually anyone, at any location, and at any time.

In addition, a method and system is needed for providing a communication link between all parties in the distribution chain associated with a specific ornamental organism through which each of the parties can provide post-sale data/information associated with specific ornamental organisms in order to gain insight into preferred practices associated with the distribution and care of the ornamental organisms.

SUMMARY

In accordance with one embodiment, a system and method for providing an ornamental organism tracking and information system includes a process for providing an ornamental organism tracking and information system whereby ornamental organisms are received from producers, providers, and/or collectors, either as individual ornamental organisms, or as lots of the same species of ornamental organisms sharing the same source data. Source data associated with the ornamental organisms is then obtained and recorded. In one embodiment, the source data includes, but is not limited to, any one or more of, data indicating the specific organism's collector and provider; data indicating the specific organism's country/region of origin; data indicating the husbandry of the organism; GPS data indicating the specific organism's location of origin; data indicating the date/time of capture; data indicating the method of capture; and/or data indicating a supply chain associated with each specific ornamental organism, or lot of ornamental organisms.

In one embodiment, the source data associated with each specific ornamental organism, or lot of ornamental organisms, is then stored in an account/location in a memory, website, or other ornamental organism database, collectively referred to herein as an "ornamental organism database", that is dedicated to, and/or identified with, each specific ornamental organism, or lot of ornamental organisms. In one embodiment, each account/location in the ornamental organism database that is dedicated to, and/or identified with, each specific ornamental organism, or lot of ornamental organisms, is then given a unique access path, such as, but not limited to, any one or more of, a unique URL link, a unique password, a unique bar code, and/or any other mechanism for uniquely accessing an individual account/location in a memory, website, or other ornamental organism database.

In one embodiment, a unique information access device, such as a sticker or tag, is then generated for each specific ornamental organism, or lot of ornamental organisms. In one embodiment, the unique information access device includes a unique account access symbol or code, such as a standard or matrix bar code, printed thereon that is associated with, or is a representation of, the unique access path data. In one embodiment, when the unique account access symbol or code is scanned using a computing system, such as, but not limited to, a smart phone, the unique access path data is obtained and provided to the computing system. The computing system is then automatically pointed/directed to the unique account/location in the ornamental organism database that is dedicated to, and/or identified with, the associated specific ornamental organism, or lot of ornamental organisms.

In some embodiments, the unique information access device, including the unique account access symbol or code, is then attached to, or otherwise included with the cage, crate, container, bag, cup, or other transportation/holding enclosure containing the specific ornamental organism, or lot of ornamental organisms. In other embodiments, the unique information access device, including the unique account access symbol or code, is provided with the specific ornamental organism, or lot of ornamental organisms, for use and/or distribution with specific ornamental organism, or lot of ornamental organisms, at the wholesale, retail, or end consumer levels. In other embodiments, the unique information access device, including the unique account access symbol or code, is included with, associated with, and/or transferred to, the same locations as the specific ornamental organism, or lot of ornamental organisms, for use by any parties further down the ornamental organism distribution and sales chain.

In one embodiment, any party in the ornamental organism distribution and sales chain, such as a wholesale distributor, a retailer, and/or a consumer, who desires source data associated with the specific ornamental organism can then readily access the source data in the unique account/location in the ornamental organism database that is dedicated to, and/or identified with, the associated specific ornamental organism, or lot of ornamental organisms, by simply scanning the unique account access symbol or code included on the unique information access device included with the specific ornamental organism, or lot of ornamental organisms.

Figure 1:
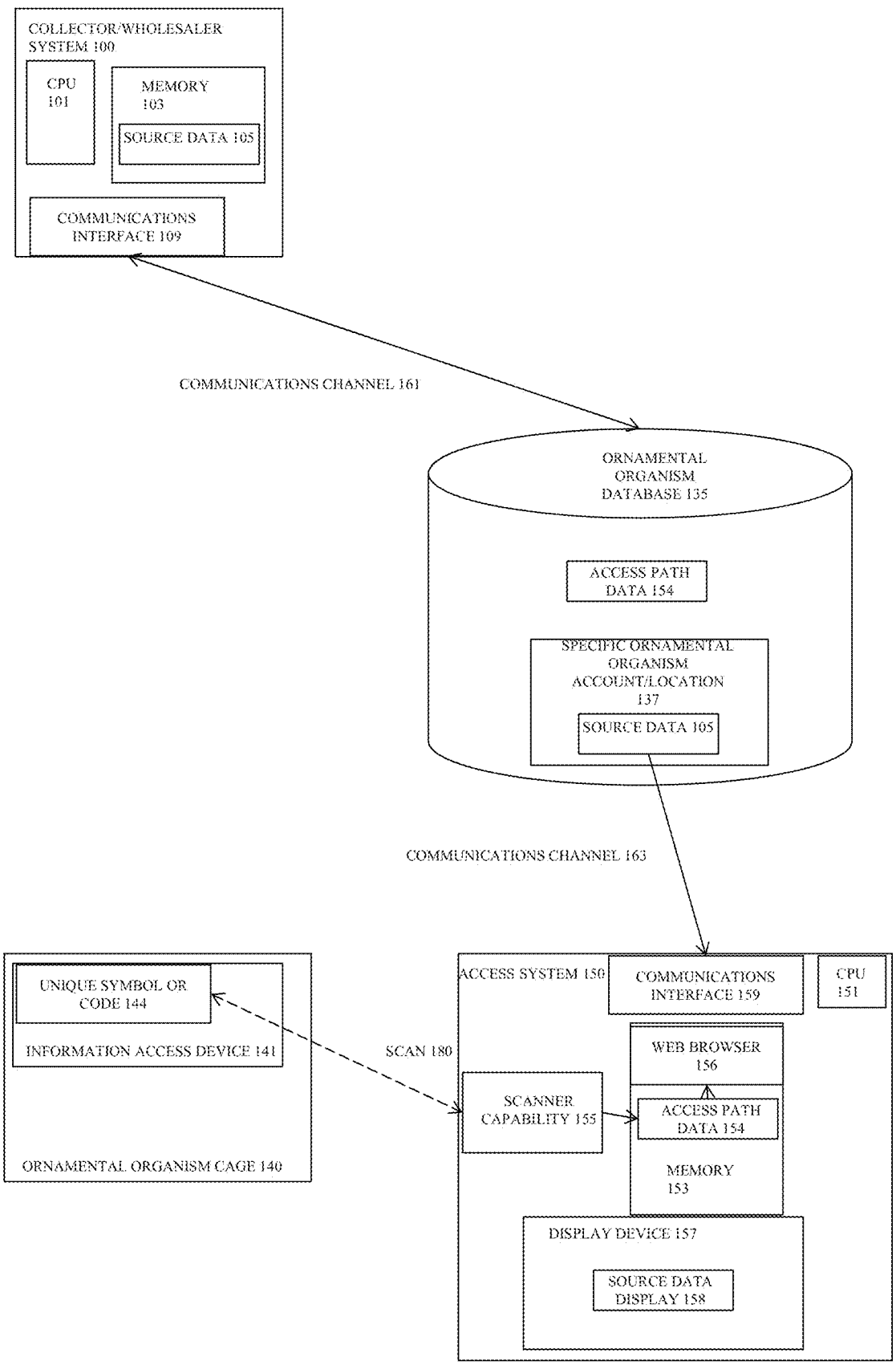
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for providing an ornamental organism tracking and information system includes a process for providing an ornamental organism tracking and information system implemented on one or more computing systems.

As used herein, the term "computing system", includes, but is not limited to, a mobile computing system; a portable computing system; a laptop computing system; a notebook computing system; a tablet computing system; a mobile phone; a smart phone; a wireless telephone; a two-way pager; a Personal Digital Assistant (PDA); a media player, i.e., an MP3 player and/or other music and/or video player; an Internet appliance; a desktop computing system; a workstation; a server computing system; or any device that includes components that can execute all, or part, of any one of the processes and/or operations as described herein.

In addition, as used herein, the term computing system, can denote, but is not limited to, systems made up of multiple portable computing systems; mobile computing systems; laptop computing systems; notebook computing systems; tablet computing systems; desktop computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In one embodiment, a specific ornamental organism, or a lot of ornamental organisms from the same region and producer/provider/collector, is received from an ornamental organism producer/provider/collector that captured, or otherwise acquired or produced the specific ornamental organism, or a lot of ornamental organisms.

As noted above, herein, the terms "collector", "provider" and "producer" of ornamental organisms include, but are not limited to, parties trapping, catching, collecting, breeding, or otherwise making available ornamental organisms. For instance, a "collector", "provider" and "producer" can be, but are not limited to, persons that gather organisms from the wild, breeders of organisms, aqua-culturists, mari-culturalists, and various other parties that obtain and provide ornamental organisms by any method, means, mechanism, process or procedure, as discussed herein, and/or as known in the art at the time of filing, and/or are developed after the time of filing. Herein, the term "collector" is used at times to represent any or all of "collectors", "providers" and/or "producers" of ornamental organisms.

In one embodiment, when the specific ornamental organism, or a lot of ornamental organisms sharing the same source data, is received from the collector, the source data associated with the specific ornamental organism, or lot of ornamental organisms, is obtained and recorded.

In one embodiment, the source data includes, but is not limited to, any one or more of, data indicating the specific ornamental organism's, or lot of ornamental organisms', collector, producer, and/or provider; data indicating the specific ornamental organism's, or lot of ornamental organisms' country/region of origin; data indicating the husbandry applied to the specific ornamental organism, or lot of ornamental organisms; GPS data indicating the specific ornamental organism's, or lot of ornamental organisms', location of origin; data indicating the date/time of capture; data indicating the method of capture; and/or data indicating a supply chain associated with each specific ornamental organism, or lot of ornamental organisms.

In one embodiment, the source data associated with each specific ornamental organism, or lot of ornamental organisms, is collected systematically via a standardized source data entry screen, or any other user interface screen, provided on a collector's, and/or wholesale distributor's, computing system by one or more software applications associated with the process for providing an ornamental organism tracking and information system.

In some embodiments, the standardized source data entry screen is provided on a collector's and/or wholesale distributor's mobile, or smart phone-based, computing system by one or more mobile software applications (mobile apps) associated with the process for providing an ornamental organism tracking and information system.

In various embodiments, using the source data entry screen, a user, such as a collector/producer/provider or wholesale buyer, enters source data as requested/prompted. By using a standardized source data entry screen, desired source data is collected in a systematic and consistent manner. In addition, a record of the source data is created for use as evidence for marketing, standard conformance, certification approval, and/or legal purposes.

In one embodiment, where possible, some of the data entry fields of the source data entry screen are automatically populated for further accuracy. As one illustrative example, in one embodiment, data indicating the specific organism's location of origin is obtained using a Global Positioning Satellite (GPS) system and/or a GPS capability provided with a collector's or wholesale buyer's computing system. In various embodiments, the geo-location data is determined based on analysis of a communication signal used and/or emitted by a collector's or wholesale buyer's computing system and/or the relay stations used by a collector's or wholesale buyer's computing system.

In various embodiments, the geo-location data indicating the specific organism's location of origin is provided by a collector's or wholesale buyer's computing system via one or more data links or networks. In various embodiments, the geo-location data indicating the specific organism's location of origin is obtained by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining geo-location data associated with a computing system. Consequently, a more detailed discussion of any particular means, method, system, algorithm, procedure, and process for obtaining geo-location data indicating the specific organism's location of origin is omitted here to avoid detracting from the invention.

In one embodiment, once obtained, the source data associated with each specific ornamental organism, and data identifying the specific ornamental organism, or lot of ornamental organisms, is assigned its own account and/or location in a memory, website, or other ornamental organism database, referred to herein collectively as an "ornamental organism database".

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; a website, webpage, or other web-based or cloud-based function; and/or an external and/or portable hard drive. Herein, the term "database" can refer to a dedicated mass storage device implemented in software, hardware, or a combination of hardware and software. Herein, the term "database" can refer to any data storage means that is part of, or under the control of, any computing system, as discussed herein, known at the time of filing, or as developed thereafter.

In one embodiment, the source data associated with each specific ornamental organism, or lot of ornamental organisms, is then stored in its associated/assigned account/location in the ornamental organism database.

In one embodiment, each account/location in the ornamental organism database that is dedicated to, and/or identified with, each specific ornamental organism, or lot of ornamental organisms, is then given a unique access path, such as, but no limited to, any one or more of, a unique URL link, a unique password, a unique bar code, and/or any other location/account unique mechanism for accessing an individual account/location in a memory, website, or other ornamental organism database.

As one illustrative example, the ornamental organism database is a website consisting of multiple source data webpages with each webpage being dedicated to a specific ornamental organism, or lot of ornamental organisms. In this example, each unique access path connects to an assigned unique webpage dedicated to a specific ornamental organism, or lot of ornamental organisms, where the source information for the specific ornamental organism, or lot of ornamental organisms, is stored and can be accessed. Consequently, in this illustrative example, when the unique access path associated with a specific ornamental organism is activated, the user is taken directly to a unique webpage dedicated to the associated specific ornamental organism, or lot of ornamental organisms that includes the specific ornamental organism source data.

In one embodiment, a unique information access device, such as a sticker or tag, is then generated for each specific ornamental organism, or lot of ornamental organisms. In one embodiment, the unique information access device includes a unique account access symbol or code, such as a standard or matrix bar code, printed thereon that encodes the unique access path data.

In one embodiment, when the unique account access symbol or code is optically scanned using a computing system, such as, but not limited to, a smart phone, the unique access path data is decoded and provided to a web browser implemented on the computing system, and the web browser is automatically pointed/directed to the unique account/location in the web-based ornamental organism database that is dedicated to, and/or identified with, the associated specific ornamental organism, or lot of ornamental organisms.

A specific example of unique account access symbols or codes used in one embodiment are the matrix bar codes known as Quick Reference™ (QR) codes. In one embodiment, the QR Code™ is detected as a QR Code™ two-dimensional digital image by a semiconductor image sensor, such as are readily available with most current mobile computing devices.

The QR Code™ is then digitally analyzed by a programmed processor, also readily available with most current mobile computing devices. The programmed processor then locates three distinctive squares at the corners of the QR Code™ two-dimensional digital image, and uses a smaller square near the fourth corner to normalize the image for size, orientation, and angle of viewing. Small dots on the QR Code™ two-dimensional digital image that encode the unique access path data are then converted to binary numbers and validity checked with an error-correcting code.

In one embodiment, the binary number representations of the unique access path data associated with the specific ornamental organism, or lot of ornamental organisms, are then used/processed to access the unique account/location in the ornamental organism database that is dedicated to, and/or identified with, the associated specific ornamental organism, or lot of ornamental organisms. For instance, in one example, the binary number representations of the unique access path data associated with the specific ornamental organism, or lot of ornamental organisms, are used/processed to point the user's web browser to the unique account/location, such as a unique webpage, that is dedicated to, and/or identified with, the associated specific ornamental organism, or lot of ornamental organisms.

In some embodiments, the unique information access device including the unique account access symbol or code is a "static cling" sticker having the unique account access symbol or code printed thereon. In some embodiments, the unique information access device including the unique account access symbol or code is a traditional sticker having the unique account access symbol or code printed thereon. In some embodiments, the unique information access device including the unique account access symbol or code is a card, such as a plastic or cardboard card, having the unique account access symbol or code printed thereon. In some embodiments, the unique information access device including the unique account access symbol or code is a printed document having the unique account access symbol or code printed thereon. In various other embodiments, the unique information access device including the unique account access symbol or code is any device, means, or mechanism for providing the unique account access symbol or code associated with a specific ornamental organism, or lot of ornamental organisms, that can be delivered with, associated with, transferred with, and/or included with, a specific ornamental organism, or lot of ornamental organisms, as discussed herein, and/or as known in the art at the time filing, and/or as developed after the time of filing.

In some embodiments, the unique information access device including the unique account access symbol or code is attached to, or otherwise included with the cage, crate, bag, cup, or other transportation/holding enclosure containing the specific ornamental organism, or lot of ornamental organisms. In other embodiments, the unique information access device, including the unique account access symbol or code, is provided with the specific ornamental organism, or lot of ornamental organisms, for use and/or distribution with specific ornamental organism, or lot of ornamental organisms, at the wholesale, retail, or end consumer levels. In other embodiments, the unique information access device, including the unique account access symbol or code, is transferred with the specific ornamental organism, or lot of ornamental organisms, for use by any parties in the ornamental organism distribution and sales chain.

In one embodiment, any party in the ornamental organism distribution and sales chain, such as a wholesale distributor, a retailer, and/or a consumer, who desires source data associated with the specific ornamental organism can then readily access the source data associated the specific ornamental organism, or lot of ornamental organisms, at any time, by simply scanning the unique account access symbol or code included on the unique information access device provided with the specific ornamental organism, or lot of ornamental organisms, using any smart phone, or other mobile or desktop computing system, that includes an optical scanning capability.

As discussed above, in one embodiment, once the unique account access symbol or code included on the unique information access device provided with the specific ornamental organism, or lot of ornamental organisms, is scanned, the unique access path data is obtained and used/processed to access the unique account/location in the ornamental organism database that is dedicated to, and/or identified with, the associated specific ornamental organism, or lot of ornamental organisms. In one embodiment, the source data associated with the specific ornamental organism, or lot of ornamental organisms, is then provided and/or displayed.

In various embodiments, in addition to the source data associated with the specific ornamental organism, or lot of ornamental organisms, the unique account/location in the ornamental organism database also includes other data and links associated with the specific ornamental organism, or lot of ornamental organisms. For instance, in one embodiment, the unique account/location in the ornamental organism database also includes links to retailer and consumer sites that provide more general information about the associated ornamental organism, such as care and feeding information, mating information, compatibility information, and any other general information associated with the associated ornamental organism.

As another example, in one embodiment, the unique account/location in the ornamental organism database also includes links to consumer blog sites and/or feedback and advice sites that provide experience based feedback and recommendation information about the associated ornamental organism, such as data relaying other consumer's experiences with the associated ornamental organism in various habitats.

As a result, in one embodiment, source information associated with a specific ornamental organism, general information associated with the ornamental organism, and/or community-based input information associated with the ornamental organism, are included in the unique account/location in the ornamental organism database for the specific ornamental organism. Then, in one embodiment, a consumer is provided access to source information associated with a specific ornamental organism, general information associated with the ornamental organism, and/or community-based input information associated with the ornamental organism, via a single optical scan of the unique account access symbol or code on the unique information access device.

In one embodiment, the unique information access devices and unique account access symbols or codes are provided with the associated specific ornamental organisms, or lots of ornamental organisms, at the retail store. Consequently, in one embodiment, a consumer contemplating the purchase of a specific ornamental organism can scan the unique account access symbol while in the retail store and obtain the source, and/or other general information, about the specific ornamental organism for sale, at the store, and before making a purchase. This provides the consumer with a wealth of pre-purchase information and minimizes retail store employee's time spent answering questions.

In some embodiments, the computing system used to access the unique account/location in the memory, website, or other ornamental organism database, and the scanner used to read the unique account access symbols or codes, is provided at the retail store. For instance in one embodiment, the computing system used to access the unique account/location in the ornamental organism database, and the scanner used to read the unique account access symbols or codes, is provided at an information station/kiosk at the retail store. In these instances not only are consumers made more self-sufficient, e.g., they don't need as much help from retail employees, but the wholesale distributor and/retailer are provided an opportunity to obtain data indicating interest levels in specific ornamental organisms, even in cases where the organisms are never actually purchased.

In one embodiment, when the unique account access symbol or code included on the unique information access device provided with the specific ornamental organism, or lot of ornamental organisms, is scanned, the scanning party is asked if he or she would like to take part in one or more surveys and/or tracking programs associated with the specific ornamental organism. In one embodiment, if the consumer agrees, the consumer is asked to provide contact information. The consumer is then periodically sent surveys, or is otherwise contacted, and asked about their level of satisfaction with the organism, the condition of their organism, the habitat provided, and/or any other information desired by the wholesale distributor and/or retailer of the specific ornamental organism. Consequently, in one embodiment, a collector, and/or wholesale distributor, and/or retailer of ornamental organisms is provided a communication link with purchasing consumers in the distribution chain through which a consumer can provide post-sale data/information associated with specific ornamental organisms. This, in turn, gives the collector, and/or wholesale distributor, and/or retailer, insight into preferred sources, practices, and habitats for the proper care of the ornamental organisms. In addition, the established communication link can be used to increase consumer loyalty and/or as a marketing venue.

Using the system and method for providing an ornamental organism tracking and information system discussed herein, all parties in the distribution chain associated with a specific ornamental organism are provided access to source data for a specific ornamental organism that is linked with the specific ornamental organism. As a result, using the system and method for providing an ornamental organism tracking and information system discussed herein, the source data for a specific ornamental organism can be accessed quickly, efficiently, and economically, by virtually anyone, at any location, and at any time.

In addition, using one embodiment of the system and method for providing an ornamental organism tracking and information system discussed herein, a two-way communication link between all parties in the distribution chain associated with a specific ornamental organism is provided through which each of the parties can provide post-sale data/information associated with specific ornamental organisms in order to gain insight into preferred practices associated with the distribution and care of the ornamental organisms.

Hardware System Architecture

FIG. 1 is a block diagram of an exemplary hardware architecture for implementing one embodiment of a process for providing an ornamental organism tracking and information system, such as exemplary process 200 (FIG. 3) discussed herein.

FIG. 1 includes a collector/wholesaler system 100, e.g., a computing system accessible by a collector, and/or wholesale distributor, of ornamental organisms and including source data 105; an ornamental organism database 135, e.g., a memory, website, or other ornamental organism database containing source data 105; an ornamental organism cage 140, e.g., a cage, enclosure, container, bag, cup, or other device that is, or contains the specific ornamental organism, or lot of ornamental organisms, associated with source data 105; an information access device 141 including a unique account access symbol or code 144 that is associated with the specific ornamental organism, or lot of ornamental organisms, e.g., a sticker or tag with a standard or matrix bar code printed thereon that is associated with, or is a representation of, the unique access path data 154 for the specific ornamental organism account location 137 in ornamental organism database 135 that includes source data 105; access system 150, e.g., a computing system including a scanner capability 155 that is used to scan the unique account access symbol or code 144 of information access device 141 and access the specific ornamental organism account location 137 in ornamental organism database 135 that includes source data 105; and communication channels 161 and 163.

As seen in FIG. 1, collector/wholesaler system 100 typically includes a central processing unit (CPU) 101, a memory 103, and a communications interface 109.

Collector/wholesaler system 100 can be any computing system, including, but not limited to, a mobile computing system, such as a smart phone, notebook, laptop, tablet, or other computing system, which may have a geo-location reporting capability, as discussed herein, and/or as known in the art at the time of filing, and/or as developed thereafter, that includes components that can execute all, or part, of a process for providing an ornamental organism tracking and information system in accordance with at least one of the embodiments as described herein.

In one embodiment, collector/wholesaler system 100 includes a non-intelligent telephone system (e.g., Plain Ordinary Telephone Service, or POTS) which permits a traveler, without a computing system, to interact with an ornamental organism database 135 vocally, via keystroke, or via any method, means, function, or mechanism known in the art at the time of filing, and/or as developed after the time of filing.

In one embodiment, memory 103 includes all, or part, of location data 105. As noted above, in one embodiment, when ornamental organisms are received from collectors/producers/providers, either as individual ornamental organisms, or as lots of the same species of ornamental organisms sharing the same source data, source data 105 associated with the ornamental organisms is then obtained and recorded. In one embodiment, source data 105 includes, but is not limited to, any one or more of, data indicating the specific organism's collector/producer/provider; data indicating the specific organism's country/region of origin; husbandry data associated with the specific ornamental organism, or lot of ornamental organisms; GPS data indicating the specific organism's location of origin; data indicating the date/time of capture; data indicating the method of capture; and/or data indicating a supply chain associated with each specific ornamental organism, or lot of ornamental organisms.

Collector/wholesaler system 100 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, collector/wholesaler system 100, whether available or known at the time of filing or as later developed.

Also seen in FIG. 1, is ornamental organism database 135. As noted above, in various embodiments, ornamental organism database 135 can be, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; a website, webpage, or other web-based or cloud-based function; and/or an external and/or portable hard drive. Herein, the term "database" can refer to a dedicated mass storage device implemented in software, hardware, or a combination of hardware and software. Herein, the term "database" can refer to any data storage means that is part of, or under the control of, any computing system, as discussed herein, known at the time of filing, or as developed thereafter.

As seen in FIG. 1, ornamental organism database 135 includes source data 105, as received from collector/wholesaler system 100, and stored in specific ornamental organism account location 137 in ornamental organism database 135 that is accessed via a unique access path represented by access path data 154.

In one embodiment, source data 105 associated with the specific ornamental organism, or lot of ornamental organisms, in, or represented by, ornamental organism cage 140 is stored in a unique specific ornamental organism account location 137 of ornamental organism database 135 that is dedicated to, and/or identified with, the specific ornamental organism, or lot of ornamental organisms, in, or represented by, ornamental organism cage 140.

In one embodiment, unique specific ornamental organism account location 137 is then given a unique access path, represented by access path data 154, such as, but not limited to, any one or more of, a unique URL link, a unique password, a unique bar code, and/or any other mechanism for uniquely accessing an individual account/location in a memory, website, or other ornamental organism database.

Ornamental organism database 135 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, an ornamental organism database 135, whether available or known at the time of filing or as later developed.

Also shown in FIG. 1 is ornamental organism cage 140 that is a cage, enclosure, container, bag, cup, or other device that contains the specific ornamental organism, or lot of ornamental organisms, associated with source data 105, or represents the specific ornamental organism, or lot of ornamental organisms, associated with source data 105.

In one embodiment, ornamental organism cage 140 includes information access device 141. In one embodiment, information access device 141 is a unique information access device, such as a sticker or tag, which is generated for the specific ornamental organism, or lot of ornamental organisms, associated with source data 105. In one embodiment, the information access device 141 includes unique account access symbol or code, i.e., unique symbol or code 144, such as a standard or matrix bar code, printed thereon that encodes access path data 154.

In one embodiment, unique symbol or code 144 includes an encoded representation of access path data 154. Consequently, when unique symbol or code 144 is optically scanned using a computing system, such as, but not limited to, a smart phone, e.g., access system 150, access path data 154 is decoded and provided to a web browser, such as web browser 156, implemented on the computing system, such as access system 150, and the web browser is automatically pointed/directed to unique specific ornamental organism account location 137 that is dedicated to, and/or identified with, the associated specific ornamental organism, or lot of ornamental organisms, of source data 105.

A specific example of unique symbol or code 144 used in one embodiment are the matrix bar codes known as Quick Reference™ (QR) codes. In one embodiment, the QR Code™ is detected as a QR Code™ two-dimensional digital image by a semiconductor image sensor, such as are readily available with most current mobile computing devices.

The QR Code™ is then digitally analyzed by a programmed processor, also readily available with most current mobile computing devices. The programmed processor then locates three distinctive squares at the corners of the QR Code™ two-dimensional digital image, and uses a smaller square near the fourth corner to normalize the image for size, orientation, and angle of viewing. Small dots on the QR Code™ two-dimensional digital image that encode access path data 154 are then converted to binary numbers and validity checked with an error-correcting code.

In one embodiment, the binary number representations of access path data 154 is then used/processed to access the specific ornamental organism account location 137 of ornamental organism database 135 that is dedicated to, and/or identified with, the specific ornamental organism, or lot of ornamental organisms, in, or represented by, ornamental organism cage 140.

For instance, in one example, the binary number representations of access path data 154 are used/processed to point web browser 156 to specific ornamental organism account location 137 of ornamental organism database 135 that is dedicated to, and/or identified with, the specific ornamental organism, or lot of ornamental organisms, in, or represented by, ornamental organism cage 140, and associated with source data 105.

In some embodiments, information access device 141 including the unique symbol or code 144 is a "static cling" sticker having unique symbol or code 144 printed thereon. In some embodiments, information access device 141 is a traditional sticker having unique symbol or code 144 printed thereon. In some embodiments, information access device 141 is a card, such as a plastic or cardboard card, having unique symbol or code 144 printed thereon. In some embodiments, information access device 141 is a printed document having unique symbol or code 144 printed thereon. In various other embodiments, information access device 141 is any device, means, or mechanism for providing unique symbol or code 144 associated with a specific ornamental organism, or lot of ornamental organisms, that can be delivered with, associated with, transferred with, and/or included with, a specific ornamental organism, or lot of ornamental organisms, as discussed herein, and/or as known in the art at the time filing, and/or as developed after the time of filing.

As noted above, in some embodiments, information access device 141, including unique symbol or code 144, is attached to, or otherwise included with ornamental organism cage 140. In other embodiments, information access device 141, including unique symbol or code 144, is provided with the specific ornamental organism, or lot of ornamental organisms, represented by ornamental organism cage 140 for use and/or distribution with specific ornamental organism, or lot of ornamental organisms at the wholesale, retail, or consumer levels. In other embodiments, information access device 141, including unique symbol or code 144, is transferred with the specific ornamental organism, or lot of ornamental organisms, represented by ornamental organism cage 140 for use by any parties in the ornamental organism distribution and sales chain.

As seen in FIG. 1, access system 150 typically includes a central processing unit (CPU) 151, a memory 153, a scanner capability 155, a display device 157, and a communications interface 159.

Collector/wholesaler system 100 can be any computing system, including, but not limited to, a mobile computing system, such as a smart phone, notebook, laptop, tablet, or other computing system, which may have a geo-location reporting capability, as discussed herein, and/or as known in the art at the time of filing, and/or as developed thereafter, that includes components that can execute all, or part, of a process for providing an ornamental organism tracking and information system in accordance with at least one of the embodiments as described herein.

In one embodiment, memory 103 includes all, or part, of access path data 154 obtained from the scanning of unique symbol or code 144 of information access device 141 by scanner capability 155 at scan 180.

In one embodiment, access path data 154 is provided to web browser 156 where, as discussed above, access path data 154 is used/processed to point web browser 156 to specific ornamental organism account location 137 of ornamental organism database 135 that is dedicated to, and/or identified with, the specific ornamental organism, or lot of ornamental organisms, in, or represented by, ornamental organism cage 140.

In one embodiment, source data 105 is then accessed and provided as source data display 158 on display device 157 of access system 150.

Access system 150 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, access system 150, whether available or known at the time of filing or as later developed.

In one embodiment, either, or both, of communications channels 161 and 163 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, collector/wholesaler system 100, and/or an ornamental organism database 135, and/or access system 150, are part of a cloud computing environment.

Those of skill in the art will readily recognize that the components shown in FIG. 1, and their respective subcomponents are shown for illustrative purposes only and that architectures with more or fewer components can implement, and benefit from, the invention. In addition, the particular type of, and configuration of, collector/wholesaler system 100, and/or an ornamental organism database 135, and/or access system 150, are not relevant.

Process

In accordance with one embodiment, a system and method for providing an ornamental organism tracking and information system includes a process for providing an ornamental organism tracking and information system whereby ornamental organisms are received from producers, providers, and/or collectors, either as individual ornamental organisms, or as lots of the same species of ornamental organisms sharing the same source data. Source data associated with the ornamental organisms is then obtained and recorded. In one embodiment, the source data includes, but is not limited to, any one or more of, data indicating the specific organism's collector and provider; data indicating the specific organism's country/region of origin; data indicating the husbandry of the organism; GPS data indicating the specific organism's location of origin; data indicating the date/time of capture; data indicating the method of capture; and/or data indicating a supply chain associated with each specific ornamental organism, or lot of ornamental organisms.

In one embodiment, the source data associated with each specific ornamental organism, or lot of ornamental organisms, is then stored in an account/location in a memory, website, or other ornamental organism database, collectively referred to herein as an "ornamental organism database", that is dedicated to, and/or identified with, each specific ornamental organism, or lot of ornamental organisms. In one embodiment, each account/location in the ornamental organism database that is dedicated to, and/or identified with, each specific ornamental organism, or lot of ornamental organisms, is then given a unique access path, such as, but not limited to, any one or more of, a unique URL link, a unique password, a unique bar code, and/or any other mechanism for uniquely accessing an individual account/location in a memory, website, or other ornamental organism database.

In one embodiment, a unique information access device, such as a sticker or tag, is then generated for each specific ornamental organism, or lot of ornamental organisms. In one embodiment, the unique information access device includes a unique account access symbol or code, such as a standard or matrix bar code, printed thereon that is associated with, or is a representation of, the unique access path data. In one embodiment, when the unique account access symbol or code is scanned using a computing system, such as, but not limited to, a smart phone, the unique access path data is obtained and provided to the computing system. The computing system is then automatically pointed/directed to the unique account/location in the ornamental organism database that is dedicated to, and/or identified with, the associated specific ornamental organism, or lot of ornamental organisms.

In some embodiments, the unique information access device, including the unique account access symbol or code, is then attached to, or otherwise included with the cage, crate, container, bag, cup, or other transportation/holding enclosure containing the specific ornamental organism, or lot of ornamental organisms. In other embodiments, the unique information access device, including the unique account access symbol or code, is provided with the specific ornamental organism, or lot of ornamental organisms, for use and/or distribution with specific ornamental organism, or lot of ornamental organisms, at the wholesale, retail, or end consumer levels. In other embodiments, the unique information access device, including the unique account access symbol or code, is included with, associated with, and/or transferred to, the same locations as the specific ornamental organism, or lot of ornamental organisms, for use by any parties further down the ornamental organism distribution and sales chain.

In one embodiment, any party in the ornamental organism distribution and sales chain, such as a wholesale distributor, a retailer, and/or a consumer, who desires source data associated with the specific ornamental organism can then readily access the source data in the unique account/location in the ornamental organism database that is dedicated to, and/or identified with, the associated specific ornamental organism, or lot of ornamental organisms, by simply scanning the unique account access symbol or code included on the unique information access device included with the specific ornamental organism, or lot of ornamental organisms.

Figure 2:
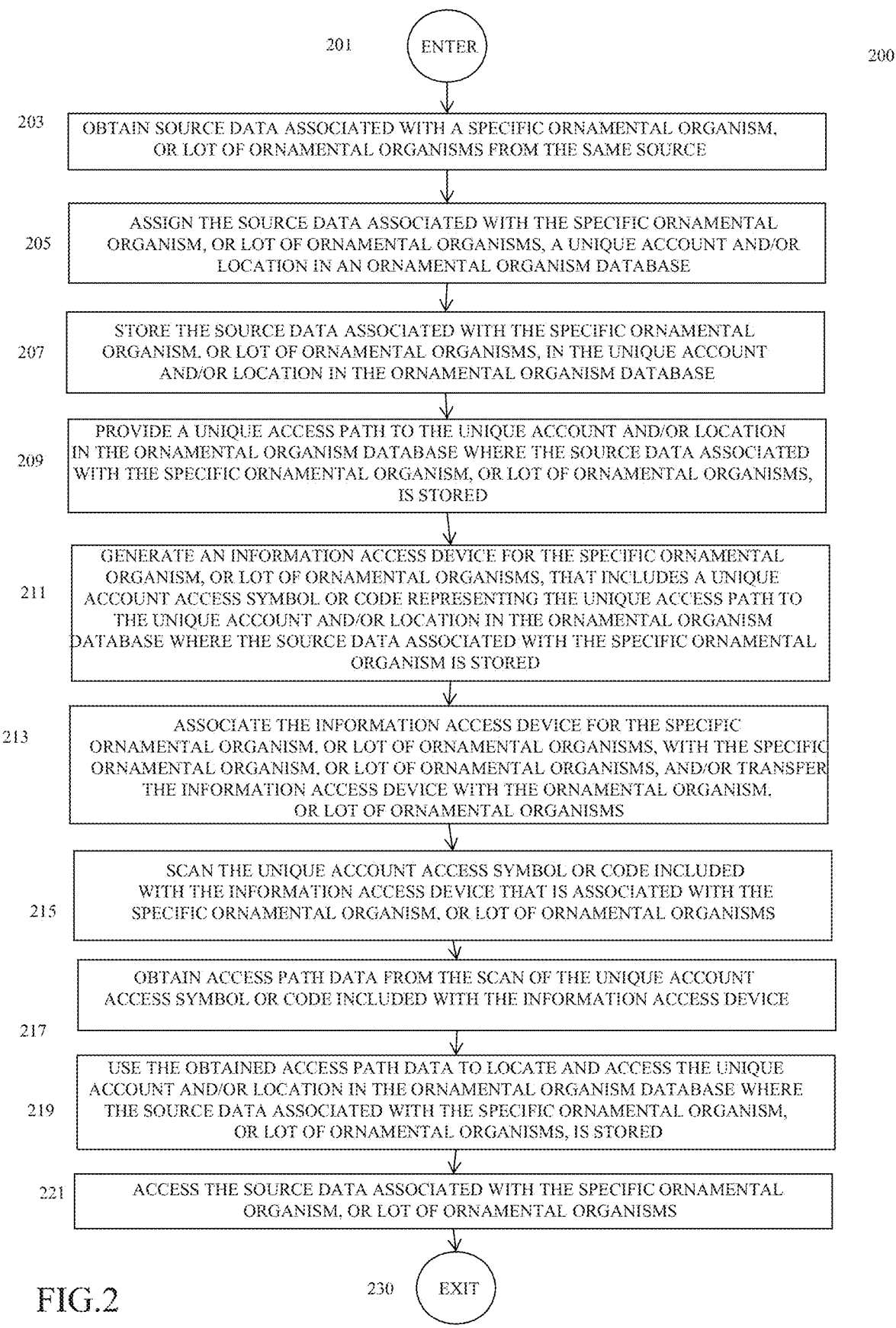
FIG. 2 is a flow chart depicting a process for providing an ornamental organism tracking and information system in accordance with one embodiment.

FIG. 2 is a flow chart depicting a process 200 for providing an ornamental organism tracking and information system in accordance with one embodiment. Process 200 for providing an ornamental organism tracking and information system begins at ENTER OPERATION 201 of FIG. 2 and process flow proceeds to OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203.

In one embodiment, at OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203, a specific ornamental organism, or a lot of ornamental organisms from the same region and/or collector, is received from an ornamental organism collector who captured, or otherwise acquired the specific ornamental organism, or a lot of ornamental organisms, and source data associated with the specific ornamental organism, or lot of ornamental organisms, is obtained and recorded.

As noted above, herein, the terms "collector", "provider" and "producer" of ornamental organisms include, but are not limited to, parties trapping, catching, collecting, breeding, or otherwise making available ornamental organisms. For instance, "collector", "provider" and "producer" can be, but are not limited to, collectors that gather organisms from the wild, breeders of organisms, aqua-culturists, mari-culturalists, and various other parties that obtain and provide ornamental organisms by any method, means, mechanism, process or procedure, as discussed herein, and/or as known in the art at the time of filing, and/or are developed after the time of filing. As also noted above, herein, the term "collector" is used at times to represent any or all of "collectors", "providers" and/or "producers" of ornamental organisms.

In one embodiment, at OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203 the source data associated with the specific ornamental organism, or lot of ornamental organisms, includes, but is not limited to, any one or more of, data indicating the specific ornamental organism's, or lot of ornamental organisms', collector and provider; data indicating the specific ornamental organism's, or lot of ornamental organisms', country/region of origin; data indicating the husbandry provided to the specific ornamental organism, or lot of ornamental organisms; GPS data indicating the specific ornamental organism's, or lot of ornamental organisms', location of origin; data indicating the date/time of capture; data indicating the method of capture; data indicating a supply chain associated with each specific ornamental organism, or lot of ornamental organisms; and/or any other source data associated with an ornamental organism, or lot of ornamental organisms, desired, as discussed herein, and/or known in the art at the time of filing, and/or as known/developed after the time of filing.

In one embodiment, at OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203 the source data associated with each specific ornamental organism, or lot of ornamental organisms, is collected systematically via manual, automatic, or semi-automatic data entry through a standardized source data entry screen, or any other user interface screen.

In one embodiment, at OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203 the standardized source data entry screen is provided/displayed on a collector, and/or wholesale distributor's, computing system by one or more software applications associated with process 200 for providing an ornamental organism tracking and information system.

In some embodiments, at OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203 the standardized source data entry screen is provided on a collector's, and/or wholesale distributor's, mobile, or smart phone-based, computing system by one or more mobile software applications (mobile apps) associated with process 200 for providing an ornamental organism tracking and information system.

In various embodiments, using the source data entry screen, a user, such as a collector or wholesale buyer, enters source data as requested/prompted at OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203. By using a standardized source data entry screen at OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203, desired source data is collected in a systematic and consistent manner. In addition, a record of the source data is created for use as evidence for both marketing and legal purposes.

In one embodiment, some of the data entry fields of the source data entry screen are automatically populated at OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203 for further accuracy.

As one illustrative example, in one embodiment, data indicating the specific organism's location of origin is obtained using a Global Positioning Satellite (GPS) system and/or a GPS capability provided with a collector's, or wholesale buyer's, computing system. In various embodiments, the geo-location data is determined based on analysis of a communication signal used and/or emitted by a collector's, or wholesale buyer's, computing system and/or the relay stations used by a collector's, or wholesale buyer's, computing system. In various embodiments, the geo-location data indicating the specific organism's location of origin is provided by a collector's, or wholesale buyer's, computing system via one or more data links or networks. In various embodiments, the geo-location data indicating the specific organism's location of origin is obtained by any method, means, mechanism, or procedure for determining a position of a computing system as discussed herein, and/or as known in the art at the time of filing, and/or as developed after the time of filing.

Numerous means, methods, systems, algorithms, procedures, and processes are known in the art for obtaining geo-location data associated with a computing system. Consequently, a more detailed discussion of any particular means, method, system, algorithm, procedure, and process for obtaining geo-location data indicating the specific organism's location of origin is omitted here to avoid detracting from the invention.

In one embodiment, the source data is received or obtained at OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203 using any method, means, mechanism, process, or procedure for obtaining source data as discussed herein, and/or as known in the art at the time of filing, and/or as developed after the time of filing.

In one embodiment, once a specific ornamental organism, or a lot of ornamental organisms from the same region and collector, is received from an ornamental organism collector who captured, or otherwise acquired the specific ornamental organism, or a lot of ornamental organisms, and source data associated with the specific ornamental organism, or lot of ornamental organisms, is obtained and recorded at OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203, process flow proceeds to ASSIGN THE SOURCE DATA ASSOCIATED WITH THE SPECIFIC ORNAMENTAL ORGANISM, OR LOT OF ORNAMENTAL ORGANISMS, A UNIQUE ACCOUNT AND/OR LOCATION IN AN ORNAMENTAL ORGANISM DATABASE OPERATION 205.

In one embodiment, at ASSIGN THE SOURCE DATA ASSOCIATED WITH THE SPECIFIC ORNAMENTAL ORGANISM, OR LOT OF ORNAMENTAL ORGANISMS, A UNIQUE ACCOUNT AND/OR LOCATION IN AN ORNAMENTAL ORGANISM DATABASE OPERATION 205 the source data associated with each specific ornamental organism, or lot of ornamental organisms, of OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203, and data identifying the specific ornamental organism, or lot of ornamental organisms, is assigned its own account and/or location in a memory, website, or other ornamental organism database.

In one embodiment, once the source data associated with each specific ornamental organism, or lot of ornamental organisms, of OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203, and data identifying the specific ornamental organism, or lot of ornamental organisms, is assigned its own account and/or location in a memory, website, or other ornamental organism database at ASSIGN THE SOURCE DATA ASSOCIATED WITH THE SPECIFIC ORNAMENTAL ORGANISM, OR LOT OF ORNAMENTAL ORGANISMS, A UNIQUE ACCOUNT AND/OR LOCATION IN AN ORNAMENTAL ORGANISM DATABASE OPERATION 205, process flow proceeds to STORE THE SOURCE DATA ASSOCIATED WITH THE SPECIFIC ORNAMENTAL ORGANISM, OR LOT OF ORNAMENTAL ORGANISMS, IN THE UNIQUE ACCOUNT AND/OR LOCATION IN THE ORNAMENTAL ORGANISM DATABASE OPERATION 207.

In one embodiment, at STORE THE SOURCE DATA ASSOCIATED WITH THE SPECIFIC ORNAMENTAL ORGANISM, OR LOT OF ORNAMENTAL ORGANISMS, IN THE UNIQUE ACCOUNT AND/OR LOCATION IN THE ORNAMENTAL ORGANISM DATABASE OPERATION 207 the source data associated with each specific ornamental organism, or lot of ornamental organisms, of ASSIGN THE SOURCE DATA ASSOCIATED WITH THE SPECIFIC ORNAMENTAL ORGANISM, OR LOT OF ORNAMENTAL ORGANISMS, A UNIQUE ACCOUNT AND/OR LOCATION IN AN ORNAMENTAL ORGANISM DATABASE OPERATION 205 is stored in its associated/assigned account/location in the memory, website, or other ornamental organism database.

As noted above, herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; a website, webpage, or other web-based or cloud-based function; and/or an external and/or portable hard drive. Herein, the term "database" can refer to a dedicated mass storage device implemented in software, hardware, or a combination of hardware and software. Herein, the term "database" can refer to any data storage means that is part of, or under the control of, any computing system, as discussed herein, known at the time of filing, or as developed thereafter.

In one embodiment, once the source data associated with each specific ornamental organism, or lot of ornamental organisms, is stored in its associated/assigned account/location in the ornamental organism database at STORE THE SOURCE DATA ASSOCIATED WITH THE SPECIFIC ORNAMENTAL ORGANISM, OR LOT OF ORNAMENTAL ORGANISMS, IN THE UNIQUE ACCOUNT AND/OR LOCATION IN THE ORNAMENTAL ORGANISM DATABASE OPERATION 207, process flow proceeds to PROVIDE A UNIQUE ACCESS PATH TO THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM, OR LOT OF ORNAMENTAL ORGANISMS, IS STORED OPERATION 209.

In one embodiment, at PROVIDE A UNIQUE ACCESS PATH TO THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM, OR LOT OF ORNAMENTAL ORGANISMS, IS STORED OPERATION 209 each account/location in the ornamental organism database of ASSIGN THE SOURCE DATA ASSOCIATED WITH THE SPECIFIC ORNAMENTAL ORGANISM, OR LOT OF ORNAMENTAL ORGANISMS, A UNIQUE ACCOUNT AND/OR LOCATION IN AN ORNAMENTAL ORGANISM DATABASE OPERATION 205 that is dedicated to, and/or identified with, each specific ornamental organism, or lot of ornamental organisms, of OBTAIN SOURCE DATA ASSOCIATED WITH A SPECIFIC ORNAMENTAL ORGANISM, OR LOT OF ORNAMEN- TAL ORGANISMS FROM THE SAME SOURCE OPERATION 203 is given a unique access path.

In various embodiments, the unique access path of PROVIDE A UNIQUE ACCESS PATH TO THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM, OR LOT OF ORNAMENTAL ORGANISMS, IS STORED OPERATION 209, can be, but is not limited to, any one or more of, a unique URL link, a unique password, a unique bar code, and/or any other mechanism for uniquely accessing an individual account/location in a memory, website, or other ornamental organism database.

As one illustrative example, the ornamental organism database of STORE THE SOURCE DATA ASSOCIATED WITH THE SPECIFIC ORNAMENTAL ORGANISM, OR LOT OF ORNAMENTAL ORGANISMS, IN THE UNIQUE ACCOUNT AND/OR LOCATION IN THE ORNAMENTAL ORGANISM DATABASE OPERATION 207 is a website consisting of multiple source data webpages with each webpage being dedicated to a specific ornamental organism, or lot of ornamental organisms.

In this example, each unique access path of PROVIDE A UNIQUE ACCESS PATH TO THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM, OR LOT OF ORNAMENTAL ORGANISMS, IS STORED OPERATION 209 connects to an assigned unique webpage dedicated to a specific ornamental organism, or lot of ornamental organisms, where the source information for the specific ornamental organism, or lot of ornamental organisms, of OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203 is stored and can be accessed. Consequently, in this illustrative example, when the unique access path associated with a specific ornamental organism is activated, the user is taken directly to a unique webpage dedicated to the associated specific ornamental organism, or lot of ornamental organisms, that includes the specific ornamental organism source data.

In one embodiment, once each account/location in the ornamental organism database that is dedicated to, and/or identified with, each specific ornamental organism, or lot of ornamental organisms, is given a unique access path at PROVIDE A UNIQUE ACCESS PATH TO THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM, OR LOT OF ORNAMENTAL ORGANISMS, IS STORED OPERATION 209, process flow proceeds to GENERATE AN INFORMATION ACCESS DEVICE FOR THE SPECIFIC ORNAMENTAL ORGANISM, OR LOT OF ORNAMENTAL ORGANISMS, THAT INCLUDES A UNIQUE ACCOUNT ACCESS SYMBOL OR CODE REPRESENTING THE UNIQUE ACCESS PATH TO THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM IS STORED OPERATION 211.

In one embodiment, at GENERATE AN INFORMATION ACCESS DEVICE FOR THE SPECIFIC ORNAMENTAL ORGANISM, OR LOT OF ORNAMENTAL ORGANISMS, THAT INCLUDES A UNIQUE ACCOUNT ACCESS SYMBOL OR CODE REPRESENTING THE UNIQUE ACCESS PATH TO THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM IS STORED OPERATION 211, a unique information access device, such as a sticker or tag, is generated for each specific ornamental organism, or lot of ornamental organisms, of OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203.

In one embodiment, the unique information access device includes a unique account access symbol or code, such as a standard or matrix bar code, printed thereon that encodes the unique access path data. In one embodiment, when the unique account access symbol or code is optically scanned using a computing system, such as, but not limited to, a smart phone, the unique access path data is decoded and provided to the computing system which is then automatically pointed/directed to the unique account/location in the ornamental organism database that is dedicated to, and/or identified with, the associated specific ornamental organism, or lot of ornamental organisms.

A specific example of unique account access symbols or codes used in one embodiment are the matrix bar codes known as Quick Reference™ (QR) codes. In one embodiment, the QR Code™ is detected as a QR Code™ two-dimensional digital image by a semiconductor image sensor, such as are readily available with most current mobile computing devices.

The QR Code™ is then digitally analyzed by a programmed processor, also readily available with most current mobile computing devices. The programmed processor then locates three distinctive squares at the corners of the QR Code™ two-dimensional digital image, and uses a smaller square near the fourth corner to normalize the image for size, orientation, and angle of viewing. Small dots on the QR Code™ two-dimensional digital image that encode the unique access path data are then converted to binary numbers and validity checked with an error-correcting code.

In one embodiment, the binary number representations of the unique access path data associated with the specific ornamental organism, or lot of ornamental organisms. In this example, the unique access path data is then used/processed to access the unique account/location in the ornamental organism database that is dedicated to, and/or identified with, the associated specific ornamental organism, or lot of ornamental organisms. For instance, in one example, the binary number representations of the unique access path data associated with the specific ornamental organism, or lot of ornamental organisms, are used/processed to point the user's web browser to the unique account/location, such as a unique webpage, that is dedicated to, and/or identified with, the associated specific ornamental organism, or lot of ornamental organisms.

In some embodiments, the unique information access device including the unique account access symbol or code is a "static cling" sticker having the unique account access symbol or code printed thereon. In some embodiments, the unique information access device including the unique account access symbol or code is a traditional sticker having the unique account access symbol or code printed thereon.

In some embodiments, the unique information access device including the unique account access symbol or code is a card, such as a plastic or cardboard card, having the unique account access symbol or code printed thereon. In some embodiments, the unique information access device including the unique account access symbol or code is a printed document having the unique account access symbol or code printed thereon.

In various other embodiments, the unique information access device including the unique account access symbol or code is any device, means, or mechanism for providing the unique account access symbol or code associated with a specific ornamental organism, or lot of ornamental organisms, that can be delivered with, associated with, and/or included with, and/or transferred with, a specific ornamental organism, or lot of ornamental organisms, as discussed herein, and/or as known in the art at the time filing, and/or as developed after the time of filing.

Figure 3A:
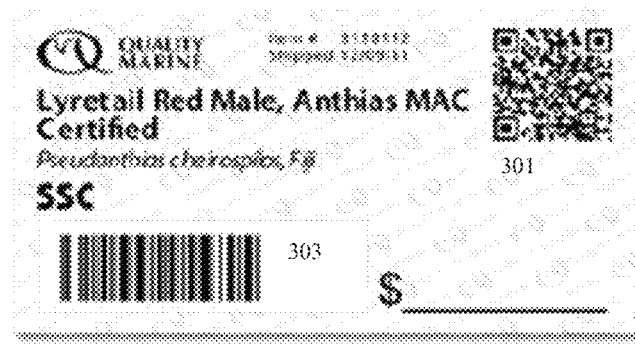
FIG. 3A shows a specific illustrative example of one unique information access device, in accordance with one embodiment.

FIG. 3A shows a specific illustrative example of one unique information access device 300, used with one embodiment. As seen in FIG. 3A, unique information access device 300 includes the printed name of the specific ornamental organism, or lot of ornamental organisms, in this illustrative example, Lyretail Red Marble, Anthias, and a printed indication that the specific ornamental organism, or lot of ornamental organisms, i.e., this specific specimen of Lyretail Red Marble, Anthias, is certified by the Marine Aquarium Council (MAC). The MAC certification informs readers that this specific specimen of Lyretail Red Marble, Anthias, was collected in an environmentally safe manner and handled to ensure optimal health.

As also seen in FIG. 3A, unique information access device 300 includes unique account access symbol or code 301 and unique account access symbol or code 303. In this specific example, unique account access symbol or code 301 is a matrix bar code, i.e., a Quick Reference™ (QR) code, and account access symbol or code 303 is a traditional bar code.

As discussed above, in this specific example, unique account access symbol or code 301 and/or unique account access symbol or code 303 encode unique access path data so that when unique account access symbol or code 301 and/or unique account access symbol or code 303 is/are optically scanned using a computing system, such as, but not limited to, a smart phone, the unique access path data is decoded and provided to the computing system which is then automatically pointed/directed to the unique account/location in the ornamental organism database that is dedicated to, and/or identified with, the associated specific ornamental organism, or lot of ornamental organisms, in this example, the specific specimen of Lyretail Red Marble, Anthias.

Those of skill in the art will readily recognize that unique information access device 300, including unique account access symbol or code 301 and unique account access symbol or code 303, are but one illustrative example of any number of possible unique information access devices. Consequently the specific example shown in FIG. 3A does not limit the scope of the claims presented below.

Returning to FIG. 2, in one embodiment, once a unique information access device is generated for each specific ornamental organism, or lot of ornamental organisms of OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203 at GENERATE AN INFORMATION ACCESS DEVICE FOR THE SPECIFIC ORNAMENTAL ORGANISM, OR LOT OF ORNAMENTAL ORGANISMS, THAT INCLUDES A UNIQUE ACCOUNT ACCESS SYMBOL OR CODE REPRESENTING THE UNIQUE ACCESS PATH TO THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM IS STORED OPERATION 211, process flow proceeds to ASSOCIATE THE INFORMATION ACCESS DEVICE FOR THE SPECIFIC ORNAMENTAL ORGANISM, OR LOT OF ORNAMENTAL ORGANISMS, WITH THE SPECIFIC ORNAMENTAL ORGANISM, OR LOT OF ORNAMENTAL ORGANISMS, AND/OR TRANSFER THE INFORMATION ACCESS DEVICE WITH THE ORNAMENTAL ORGANISM, OR LOT OF ORNAMENTAL ORGANISMS OPERATION 213.

In one embodiment, at ASSOCIATE THE INFORMATION ACCESS DEVICE FOR THE SPECIFIC ORNAMENTAL ORGANISM, OR LOT OF ORNAMENTAL ORGANISMS, WITH THE SPECIFIC ORNAMENTAL ORGANISM, OR LOT OF ORNAMENTAL ORGANISMS, AND/OR TRANSFER THE INFORMATION ACCESS DEVICE WITH THE ORNAMENTAL ORGANISM, OR LOT OF ORNAMENTAL ORGANISMS OPERATION 213 the unique information access device including the unique account access symbol or code is ASSOCIATED WITH THE SPECIFIC ORNAMENTAL ORGANISMS, or lots of ornamental organisms, of OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203.

In one embodiment, at ASSOCIATE THE INFORMATION ACCESS DEVICE FOR THE SPECIFIC ORNAMENTAL ORGANISM, OR LOT OF ORNAMENTAL ORGANISMS, WITH THE SPECIFIC ORNAMENTAL ORGANISM, OR LOT OF ORNAMENTAL ORGANISMS, AND/OR TRANSFER THE INFORMATION ACCESS DEVICE WITH THE ORNAMENTAL ORGANISM, OR LOT OF ORNAMENTAL ORGANISMS OPERATION 213 the unique information access device including the unique account access symbol or code is attached to, or otherwise included with the cage, crate, container, bag, cup, or other transportation/holding enclosure containing the specific ornamental organism, or lot of ornamental organisms.

In other embodiments, at ASSOCIATE THE INFORMATION ACCESS DEVICE FOR THE SPECIFIC ORNAMENTAL ORGANISM, OR LOT OF ORNAMENTAL ORGANISMS, WITH THE SPECIFIC ORNAMENTAL ORGANISM, OR LOT OF ORNAMENTAL ORGANISMS, AND/OR TRANSFER THE INFORMATION ACCESS DEVICE WITH THE ORNAMENTAL ORGANISM, OR LOT OF ORNAMENTAL ORGANISMS OPERATION 213 the unique information access device including the unique account access symbol or code is provided with the specific ornamental organism, or lot of ornamental organisms, for use and/or distribution with specific ornamental organism, or lot of ornamental organisms, at the wholesale, retail, or consumer levels.

In other embodiments, at ASSOCIATE THE INFORMATION ACCESS DEVICE FOR THE SPECIFIC ORNAMENTAL ORGANISM, OR LOT OF ORNAMENTAL ORGANISMS, WITH THE SPECIFIC ORNAMENTAL ORGANISM, OR LOT OF ORNAMENTAL ORGANISMS, AND/OR TRANSFER THE INFORMATION ACCESS DEVICE WITH THE ORNAMENTAL ORGANISM, OR LOT OF ORNAMENTAL ORGANISMS OPERATION 213 the unique information access device including the unique account access symbol or code is transferred with the specific ornamental organism, or lot of ornamental organisms, for use by any parties in the ornamental organism distribution and sales chain.

In one embodiment, once the unique information access device including the unique account access symbol or code is associated with the specific ornamental organisms, or lots of ornamental organisms, of OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203 at ASSOCIATE THE INFORMATION ACCESS DEVICE FOR THE SPECIFIC ORNAMENTAL ORGANISM, OR LOT OF ORNAMENTAL ORGANISMS, WITH THE SPECIFIC ORNAMENTAL ORGANISM, OR LOT OF ORNAMENTAL ORGANISMS, AND/OR TRANSFER THE INFORMATION ACCESS DEVICE WITH THE ORNAMENTAL ORGANISM, OR LOT OF ORNAMENTAL ORGANISMS OPERATION 213 process flow proceeds to SCAN THE UNIQUE ACCOUNT ACCESS SYMBOL OR CODE INCLUDED WITH THE INFORMATION ACCESS DEVICE THAT IS ASSOCIATED WITH THE SPECIFIC ORNAMENTAL ORGANISM, OR LOT OF ORNAMENTAL ORGANISMS OPERATION 215.

In one embodiment, at SCAN THE UNIQUE ACCOUNT ACCESS SYMBOL OR CODE INCLUDED WITH THE INFORMATION ACCESS DEVICE THAT IS ASSOCIATED WITH THE SPECIFIC ORNAMENTAL ORGANISM, OR LOT OF ORNAMENTAL ORGANISMS OPERATION 215 any party in the ornamental organism distribution and sales chain, such as a wholesale distributor, a retailer, and/or a consumer, who desires source data associated with the specific ornamental organism scans the unique account access symbol or code included on the unique information access device provided with the specific ornamental organism, or lot of ornamental organisms, using any computing system as discussed herein, and/or as known in the art at the time of filing, and/or as developed/made available after the time of filing.

In one embodiment, the scanner/scanning capability used to read the unique account access symbols or codes, is associated with a mobile phone, or other mobile computing system, associated with the scanning party.

In one embodiment, the scanner/scanning capability used to read the unique account access symbols or codes, is provided at the retail store. For instance in one embodiment, the computing system used to access the unique account/ location in the ornamental organism database, and the scanner used to read the unique account access symbols or codes, is provided at an information station/kiosk at the retail store. In these instances, not only are consumers made more self-sufficient, e.g., they don't need as much help from retail employees, but the wholesale distributor and/retailer are provided an opportunity to obtain data indicating interest levels in specific ornamental organisms, even in cases where the organisms are never actually purchased.

In one embodiment, once any party in the ornamental organism distribution and sales chain, such as a wholesale distributor, a retailer, and/or a consumer, who desires source data associated with the specific ornamental organism scans the unique account access symbol or code included on the unique information access device provided with the specific ornamental organism, or lot of ornamental organisms, at SCAN THE UNIQUE ACCOUNT ACCESS SYMBOL OR CODE INCLUDED WITH THE INFORMATION ACCESS DEVICE THAT IS ASSOCIATED WITH THE SPECIFIC ORNAMENTAL ORGANISM, OR LOT OF ORNAMENTAL ORGANISMS OPERATION 215, process flow proceeds to OBTAIN ACCESS PATH DATA FROM THE SCAN OF THE UNIQUE ACCOUNT ACCESS SYMBOL OR CODE INCLUDED WITH THE INFORMATION ACCESS DEVICE OPERATION 217.

In one embodiment, at OBTAIN ACCESS PATH DATA FROM THE SCAN OF THE UNIQUE ACCOUNT ACCESS SYMBOL OR CODE INCLUDED WITH THE INFORMATION ACCESS DEVICE OPERATION 217, as a result of the scan of the unique symbol or code included on the unique information access device of SCAN THE UNIQUE ACCOUNT ACCESS SYMBOL OR CODE INCLUDED WITH THE INFORMATION ACCESS DEVICE THAT IS ASSOCIATED WITH THE SPECIFIC ORNAMENTAL ORGANISM, OR LOT OF ORNAMENTAL ORGANISMS OPERATION 215, the unique access path data is obtained.

In one embodiment, once the unique access path data is obtained at process flow proceeds to OBTAIN ACCESS PATH DATA FROM THE SCAN OF THE UNIQUE ACCOUNT ACCESS SYMBOL OR CODE INCLUDED WITH THE INFORMATION ACCESS DEVICE OPERATION 217, process flow proceeds to USE THE OBTAINED ACCESS PATH DATA TO LOCATE AND ACCESS THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM, OR LOT OF ORNAMENTAL ORGANISMS, IS STORED OPERATION 219.

In one embodiment, at USE THE OBTAINED ACCESS PATH DATA TO LOCATE AND ACCESS THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM, OR LOT OF ORNAMENTAL ORGANISMS, IS STORED OPERATION 219 the unique access path data obtained at OBTAIN ACCESS PATH DATA FROM THE SCAN OF THE UNIQUE ACCOUNT ACCESS SYMBOL OR CODE INCLUDED WITH THE INFORMATION ACCESS DEVICE OPERATION 217 is used/processed to access the unique account/location in the ornamental organism database that is dedicated to, and/or identified with, the associated specific ornamental organism, or lot of ornamental organisms.

As noted above, a specific example of unique account access symbols or codes used in one embodiment are the matrix bar codes known as Quick Reference™ (QR) codes. In one embodiment, the QR Code™ is detected as a QR Code™ two-dimensional digital image at SCAN THE UNIQUE ACCOUNT ACCESS SYMBOL OR CODE INCLUDED WITH THE INFORMATION ACCESS DEVICE THAT IS ASSOCIATED WITH THE SPECIFIC ORNAMENTAL ORGANISM, OR LOT OF ORNAMENTAL ORGANISMS OPERATION 215 by a semiconductor image sensor, such as are readily available with most current mobile computing devices.

The QR Code™ is then digitally analyzed by a programmed processor, also readily available with most current mobile computing devices. The programmed processor then locates three distinctive squares at the corners of the QR Code™ two-dimensional digital image, and uses a smaller square near the fourth corner to normalize the image for size, orientation, and angle of viewing. Small dots on the QR Code™ two-dimensional digital image that encode the unique access path data are then converted to binary numbers and validity checked with an error-correcting code at OBTAIN ACCESS PATH DATA FROM THE SCAN OF THE UNIQUE ACCOUNT ACCESS SYMBOL OR CODE INCLUDED WITH THE INFORMATION ACCESS DEVICE OPERATION 217.

In one embodiment, the binary number representations of the unique access path data associated with the specific ornamental organism, or lot of ornamental organisms are then used/processed to access the unique account/location in the ornamental organism database that is dedicated to, and/or identified with, the associated specific ornamental organism, or lot of ornamental organisms.

In one example, the binary number representations of the unique access path data associated with the specific ornamental organism, or lot of ornamental organisms, are used/processed to point the user's web browser to the unique account/location, such as a unique webpage, that is dedicated to, and/or identified with, the associated specific ornamental organism, or lot of ornamental organisms, at USE THE OBTAINED ACCESS PATH DATA TO LOCATE AND ACCESS THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM, OR LOT OF ORNAMENTAL ORGANISMS, IS STORED OPERATION 219.

In one embodiment, once the unique access path data obtained at OBTAIN ACCESS PATH DATA FROM THE SCAN OF THE UNIQUE ACCOUNT ACCESS SYMBOL OR CODE INCLUDED WITH THE INFORMATION ACCESS DEVICE OPERATION 217 is used/processed to access the unique account/location in the ornamental organism database that is dedicated to, and/or identified with, the associated specific ornamental organism, or lot of ornamental organisms, at USE THE OBTAINED ACCESS PATH DATA TO LOCATE AND ACCESS THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM, OR LOT OF ORNAMENTAL ORGANISMS, IS STORED OPERATION 219, process flow proceeds to ACCESS THE SOURCE DATA ASSOCIATED WITH THE SPECIFIC ORNAMENTAL ORGANISM, OR LOT OF ORNAMENTAL ORGANISMS OPERATION 221.

In one embodiment, at ACCESS THE SOURCE DATA ASSOCIATED WITH THE SPECIFIC ORNAMENTAL ORGANISM, OR LOT OF ORNAMENTAL ORGANISMS OPERATION 221, the scanning party of SCAN THE UNIQUE ACCOUNT ACCESS SYMBOL OR CODE INCLUDED WITH THE INFORMATION ACCESS DEVICE THAT IS ASSOCIATED WITH THE SPECIFIC ORNAMENTAL ORGANISM, OR LOT OF ORNAMENTAL ORGANISMS OPERATION 215 is directed/taken to the unique account/location in the ornamental organism database that is dedicated to, and/or identified with, the associated specific ornamental organism, or lot of ornamental organisms, and provided access to the source data associated with the specific ornamental organism, or lot of ornamental organisms, of OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203.

Figure 3B:
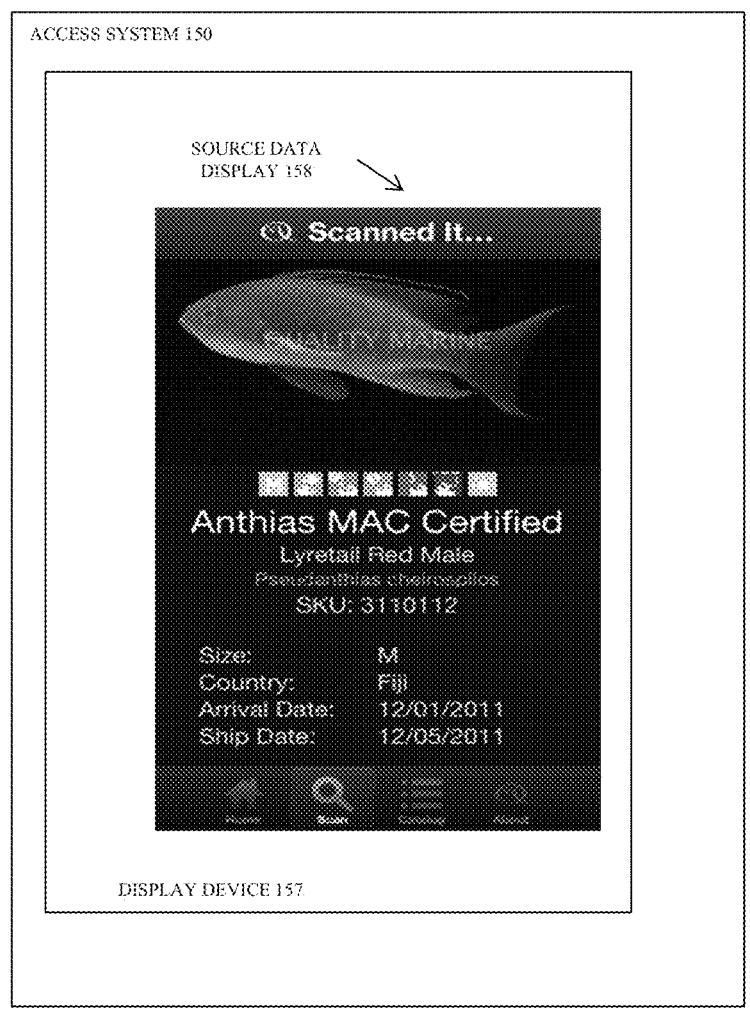
FIG. 3B shows one illustrative example of a source data display in accordance with one embodiment.

FIG. 3B shows one illustrative example of a source data display 158 that is provided from the unique account/location in the ornamental organism database that is dedicated to, and/or identified with, the associated specific ornamental organism, or lot of ornamental organisms.

Referring to FIGS. 3A and 3B together, recall that, in this specific example, unique account access symbol or code 301 and/or unique account access symbol or code 303 of unique information access device 300 (FIG. 3A) encode unique access path data so that when unique account access symbol or code 301 and/or unique account access symbol or code 303 is/are optically scanned using a computing system, such as access computing system 150 in FIGS. 1 and 3B, the unique access path data is decoded and provided to the computing system which is then automatically pointed/directed to the unique account/location in the ornamental organism database that is dedicated to, and/or identified with, the associated specific ornamental organism, or lot of ornamental organisms, in this example the specific specimen of Lyretail Red Marble, Anthias.

Once pointed/directed to the unique account/location in the ornamental organism database, source data display 158 (FIG. 3B) is displayed on display device 157 of access system 150. As seen in FIG. 3B, source data display 158 includes a picture of the ornamental organism and the name of the specific ornamental organism, i.e., Lyretail Red Marble, Anthias. Source data display 158 also indicates that this particular specimen of Lyretail Red Marble, Anthias is male and is MAC certified. Source data display 158 also indicates this specific Lyretail Red Marble, Anthias was of medium size when caught, came from Fiji, arrived at the wholesaler on Dec. 1, 2011, and was shipped to the retailer on Dec. 5, 2011.

Those of skill in the art will readily recognize that source data display 158 is but one illustrative example of any number of possible unique source data displays. Consequently the specific example shown in FIG. 3B does not limit the scope of the claims presented below.

In various embodiments, in addition to the source data associated with the specific ornamental organism, or lot of ornamental organisms, the unique account/location in the ornamental organism database also includes other data and links associated with the specific ornamental organism, or lot of ornamental organisms.

For instance, in one embodiment, the unique account/location in the ornamental organism database of STORE THE SOURCE DATA ASSOCIATED WITH THE SPECIFIC ORNAMENTAL ORGANISM, OR LOT OF ORNAMENTAL ORGANISMS, IN THE UNIQUE ACCOUNT AND/OR LOCATION IN THE ORNAMENTAL ORGANISM DATABASE OPERATION 207 also includes links to retailer and consumer sites that provide more general information about the associated ornamental organism, such as care and feeding information, mating information, compatibility information, and any other general information associated with the associated ornamental organism.

As another example, in one embodiment, the unique account/location in the ornamental organism database of STORE THE SOURCE DATA ASSOCIATED WITH THE SPECIFIC ORNAMENTAL ORGANISM, OR LOT OF ORNAMENTAL ORGANISMS, IN THE UNIQUE ACCOUNT AND/OR LOCATION IN THE ORNAMENTAL ORGANISM DATABASE OPERATION 207 also includes links to consumer blog sites and/or feedback and advice sites that provide experience based feedback and recommendation information about the associated ornamental organism, such as data relaying other consumer's experiences with the associated ornamental organism.

As a result, in one embodiment, source information associated with a specific ornamental organism, general information associated with the ornamental organism, and/or community-based input information associated with the ornamental organism, are included in the unique account/location in the ornamental organism database of STORE THE SOURCE DATA ASSOCIATED WITH THE SPECIFIC ORNAMENTAL ORGANISM, OR LOT OF ORNAMENTAL ORGANISMS, IN THE UNIQUE ACCOUNT AND/OR LOCATION IN THE ORNAMENTAL ORGANISM DATABASE OPERATION 207. Then, in one embodiment, at ACCESS THE SOURCE DATA ASSOCIATED WITH THE SPECIFIC ORNAMENTAL ORGANISM, OR LOT OF ORNAMENTAL ORGANISMS OPERATION 221, a consumer is provided access to source information associated with a specific ornamental organism, general information associated with the ornamental organism, and/or community-based input information associated with the ornamental organism, via a single optical scan of the unique account access symbol or code on the unique information access device.

As noted above, in one embodiment, the unique information access devices and unique account access symbols or codes of GENERATE AN INFORMATION ACCESS DEVICE FOR THE SPECIFIC ORNAMENTAL ORGANISM, OR LOT OF ORNAMENTAL ORGANISMS, THAT INCLUDES A UNIQUE ACCOUNT ACCESS SYMBOL OR CODE REPRESENTING THE UNIQUE ACCESS PATH TO THE UNIQUE ACCOUNT AND/OR LOCATION IN THE ORNAMENTAL ORGANISM DATABASE WHERE THE SOURCE DATA ASSOCIATED WITH THE SPECIFIC ORNAMENTAL ORGANISM IS STORED OPERATION 211 are provided with the associated specific ornamental organisms, or lots of ornamental organisms, at the retail store.

Consequently, in one embodiment, a consumer contemplating the purchase of a specific ornamental organism can scan the unique account access symbol while in the retail store and at ACCESS THE SOURCE DATA ASSOCIATED WITH THE SPECIFIC ORNAMENTAL ORGANISM, OR LOT OF ORNAMENTAL ORGANISMS OPERATION 221 can obtain the source, and/or other general information, about the specific ornamental organism for sale, at the store, and before making a purchase. This provides the consumer with a wealth of pre-purchase information and minimizes retail store employee's time spent answering questions, or handling returns and refunds.

As noted above, in some embodiments, the computing system used to access the unique account/location in the ornamental organism database, and the scanner used to read the unique account access symbols or codes, is provided at the retail store.

For instance, in one embodiment, the computing system used to access the unique account/location in the ornamental organism database, and the scanner used to read the unique account access symbols or codes, is provided at an information station/kiosk within the retail store. In these instances not only are consumers made more self-sufficient, e.g., they don't need as much help from retail employees, but the wholesale distributor and/retailer are provided an opportunity to obtain data indicating interest levels in specific ornamental organisms, even in cases where the organisms are never actually purchased.

In one embodiment, when the unique account access symbol or code included on the unique information access device provided with the specific ornamental organism, or lot of ornamental organisms, is scanned at SCAN THE UNIQUE ACCOUNT ACCESS SYMBOL OR CODE INCLUDED WITH THE INFORMATION ACCESS DEVICE THAT IS ASSOCIATED WITH THE SPECIFIC ORNAMENTAL ORGANISM, OR LOT OF ORNAMENTAL ORGANISMS OPERATION 215, and access to the source data is provided at ACCESS THE SOURCE DATA ASSOCIATED WITH THE SPECIFIC ORNAMENTAL ORGANISM, OR LOT OF ORNAMENTAL ORGANISMS OPERATION 221, the scanning party is asked if he or she would like to take part in one or more surveys and/or tracking programs associated with the specific ornamental organism.

In one embodiment, if the consumer agrees to be contacted, and/or receive surveys, at ACCESS THE SOURCE DATA ASSOCIATED WITH THE SPECIFIC ORNAMENTAL ORGANISM, OR LOT OF ORNAMENTAL ORGANISMS OPERATION 221, the consumer is asked to provide contact information. The consumer is then periodically sent surveys, or is otherwise contacted, and asked about their level of satisfaction with the organism, the condition of their organism, the habitat provided, and/or any other information desired by the wholesale distributor and/or retailer of the specific ornamental organism.

Consequently, in one embodiment, at ACCESS THE SOURCE DATA ASSOCIATED WITH THE SPECIFIC ORNAMENTAL ORGANISM, OR LOT OF ORNAMENTAL ORGANISMS OPERATION 221 a collector, and/or wholesale distributor, and/or retailer of ornamental organisms is provided a communication link with purchasing consumers in the distribution chain through which a consumer can provide post-sale data/information associated with specific ornamental organisms. This, in turn, gives the collector, and/or wholesale distributor, and/or retailer, insight into preferred sources, practices, and habitats for the proper care of the ornamental organisms. In addition, the established communication link can be used to increase consumer loyalty and/or as a marketing venue.

In one embodiment, once the scanning party of SCAN THE UNIQUE ACCOUNT ACCESS SYMBOL OR CODE INCLUDED WITH THE INFORMATION ACCESS DEVICE THAT IS ASSOCIATED WITH THE SPECIFIC ORNAMENTAL ORGANISM, OR LOT OF ORNAMENTAL ORGANISMS OPERATION 215 is directed/taken to the unique account/location in the ornamental organism database that is dedicated to, and/or identified with, the associated specific ornamental organism, or lot of ornamental organisms, and provided access to the source data associated with the specific ornamental organism, or lot of ornamental organisms, of OBTAIN SOURCE DATA ASSOCIATED WITH A SPECIFIC ORNAMENTAL ORGANISM, OR LOT OF ORNAMENTAL ORGANISMS FROM THE SAME SOURCE OPERATION 203 at ACCESS THE SOURCE DATA ASSOCIATED WITH THE SPECIFIC ORNAMENTAL ORGANISM, OR LOT OF ORNAMENTAL ORGANISMS OPERATION 221, process flow proceeds to EXIT OPERATION 230.

In one embodiment, at EXIT OPERATION 230, process 200 for providing an ornamental organism tracking and information system is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 200 for providing an ornamental organism tracking and information system, all parties in the distribution chain associated with a specific ornamental organism are provided access to source data for a specific ornamental organism that is linked with the specific ornamental organism. As a result, using process 200 for providing an ornamental organism tracking and information system, the source data for a specific ornamental organism can be accessed quickly, efficiently, and economically, by virtually anyone, at any location, and at any time.

In addition, using one embodiment of process 200 for providing an ornamental organism tracking and information system, a two-way communication link between all parties in the distribution chain associated with a specific ornamental organism is provided through which each of the parties can provide post-sale data/information associated with specific ornamental organisms in order to gain insight into preferred practices associated with the distribution and care of the ornamental organisms.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "applying", "analyzing", "assigning", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "scanning", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing an ornamental organism tracking and information system comprising the following, of which a plurality are each executed via any set of one or more processors:

obtaining source data associated with a specific ornamental organism or lot of ornamental organisms having the same source data;

storing the source data associated with the specific ornamental organism or lot of ornamental organisms in a unique location in an ornamental organism database, the unique location in the ornamental organism database being associated with the specific ornamental organism or lot of ornamental organisms;

assigning unique access path data to the unique location in the ornamental organism database associated with the specific ornamental organism or lot of ornamental organisms, wherein the unique access path data comprises a unique Uniform Resource Locator (URL);

generating a visual information access device associated with the specific ornamental organism or lot of ornamental organisms, the visual information access device including a visual unique account access symbol or code including encoded data representing the unique access path data to the unique location in the ornamental organism database;

obtaining, by scanning the unique account access symbol or code with an optical scanning device, the unique access path data;

directing a web browser to the unique URL; and accessing, using the unique access path data, the unique location in the ornamental organism database that is associated with the associated specific ornamental organism or lot of ornamental organisms.

2. The computing system implemented method of claim 1 wherein at least part of the source data includes source data selected from at least one of the group consisting of:

data indicating the specific ornamental organism's or lot of ornamental organisms' collector, gatherer, breeder, aqua-culturist, mari-culturalist, or distributor;

data indicating the specific ornamental organism's or lot of ornamental organisms' region of origin;

data indicating husbandry provided to the specific ornamental organism or lot of ornamental organisms;

GPS data indicating the specific ornamental organism's or lot of ornamental organisms' location of origin;

data indicating a time of capture of the specific ornamental organism or lot of ornamental organisms;

data indicating a method of capture of the specific ornamental organism or lot of ornamental organisms; and data indicating a supply chain associated with the specific ornamental organism or lot of ornamental organisms.

3. The computing system implemented method of claim 1 wherein the ornamental organism database is a website and the unique location in the ornamental organism database associated with the specific ornamental organism or lot of ornamental organisms is a webpage associated with the specific ornamental organism or lot of ornamental organisms.

4. The computing system implemented method of claim 1 wherein the optical scanning device comprises an optical reader implemented on a smart phone.

5. The computing system implemented method of claim 1 wherein the visual information access device is a sticker applied to a container containing the specific ornamental organism or lot of ornamental organisms.

6. The computing system implemented method of claim 1 wherein the visual information access device is a static cling sticker applied to a container containing the specific ornamental organism or lot of ornamental organisms.

7. The computing system implemented method of claim 1 wherein the unique account access symbol or code included with the visual information access device is a matrix bar code.

8. The computing system implemented method of claim 1 wherein the unique account access symbol or code included with the visual information access device is a one-dimensional bar code.

9. The computing system implemented method of claim 1 wherein the unique account access symbol or code included with the visual information access device is a holographic image.

10. The computing system implemented method of claim 1 wherein the optical scanning device comprises an optical reader implemented on a smart phone.

11. The computing system implemented method of claim 1 wherein the optical scanning device is provided by a retailer selling the specific ornamental organism or lot of ornamental organisms.

12. The computing system implemented method of claim 1 wherein the specific ornamental organism or lot of ornamental organisms comprise a fish or lot of fish purchased for use as pets or for display.

13. The computing system implemented method of claim 1 wherein the specific ornamental organism or lot of ornamental organisms comprise a reptile or lot of reptiles purchased for use as pets or for display.

14. The computing system implemented method of claim 1 wherein the specific ornamental organism or lot of ornamental organisms comprise an insect or lot of insects purchased for use as pets or for display.

15. The computing system implemented method of claim 1 wherein:

the visual unique account access symbol or code comprises a two-dimensional matrix bar code; and the unique access path data comprises a Uniform Resource Locator (URL).

16. The computing system implemented method of claim 1 wherein the visual information access device is included with an enclosure containing the specific ornamental organism or lot of ornamental organisms.

17. The computing system implemented method of claim 1 wherein the specific ornamental organism or lot of ornamental organisms comprise a plant.

18. An ornamental organism tracking and information system comprising:

at least one processor; and at least one memory coupled to the at least one processor, the at least one memory having stored therein instructions which when executed by any set of the at least one processor, perform a process for providing an ornamental organism tracking and information system, the process for providing an ornamental organism tracking and information system including:

obtaining source data associated with a specific ornamental organism or lot of ornamental organisms having the same source data;

storing the source data associated with the specific ornamental organism or lot of ornamental organisms in a unique location in an ornamental organism database, the unique location in the ornamental organism database being associated with the specific ornamental organism or lot of ornamental organisms;

assigning unique access path data to the unique location in the ornamental organism database associated with the specific ornamental organism or lot of ornamental organisms, wherein the unique access path data comprises a unique Uniform Resource Locator (URL);

generating a visual information access device associated with the specific ornamental organism or lot of ornamental organisms, the visual information access device including a visual unique account access symbol or code including encoded data representing the unique access path data to the unique location in the ornamental organism database;

obtaining, by scanning the unique account access symbol or code with an optical scanning device, the unique access path data;

directing a web browser to the unique URL, and accessing, using the unique access path data, the unique location in the ornamental organism database that is associated with the associated specific ornamental organism or lot of ornamental organisms.

19. The ornamental organism tracking and information system of claim 18 wherein at least part of the source data includes source data selected from at least one of the group consisting of:

data indicating the specific ornamental organism's or lot of ornamental organisms' collector, gatherer, breeder, aqua-culturist, mari-culturalist, or distributor;

data indicating the specific ornamental organism's or lot of ornamental organisms' region of origin;

data indicating husbandry provided to the specific ornamental organism or lot of ornamental organisms;

GPS data indicating the specific ornamental organism's or lot of ornamental organisms' location of origin;

data indicating a time of capture of the specific ornamental organism or lot of ornamental organisms;

data indicating a method of capture of the specific ornamental organism or lot of ornamental organisms; and data indicating a supply chain associated with the specific ornamental organism or lot of ornamental organisms.

20. The ornamental organism tracking and information system of claim 18 wherein the ornamental organism database is a web site and the unique location in the ornamental organism database associated with the specific ornamental organism or lot of ornamental organisms is a webpage associated with the specific ornamental organism or lot of ornamental organisms.

21. The ornamental organism tracking and information system of claim 18 wherein the optical scanning device comprises an optical reader implemented on a smart phone.

22. The ornamental organism tracking and information system of claim 18 wherein the visual information access device is a sticker applied to a container containing the specific ornamental organism or lot of ornamental organisms.

23. The ornamental organism tracking and information system of claim 18 wherein the visual information access device is a static cling sticker applied to a container containing the specific ornamental organism or lot of ornamental organisms.

24. The ornamental organism tracking and information system of claim 18 wherein the unique account access symbol or code included with the visual information access device is a matrix bar code.

25. The ornamental organism tracking and information system of claim 18 wherein the unique account access symbol or code included with the visual information access device is a one-dimensional bar code.

26. The ornamental organism tracking and information system of claim 18 wherein the unique account access symbol or code included with the visual information access device is a holographic image.

27. The ornamental organism tracking and information system of claim 18 wherein the optical scanning device comprises an optical reader implemented on a smart phone.

28. The ornamental organism tracking and information system of claim 18 wherein the optical scanning device is provided by a retailer selling the specific ornamental organism or lot of ornamental organisms.

29. The ornamental organism tracking and information system of claim 18 wherein the specific ornamental organism or lot of ornamental organisms comprise a fish or lot of fish purchased for use as pets or for display.

30. The ornamental organism tracking and information system of claim 18 wherein the specific ornamental organism or lot of ornamental organisms comprise a reptile or lot of reptiles purchased for use as pets or for display.

31. The ornamental organism tracking and information system of claim 18 wherein the specific ornamental organism or lot of ornamental organisms comprise an insect or lot of insects purchased for use as pets or for display.

32. The computing system implemented method of claim 18 wherein:

the visual unique account access symbol or code comprises a two-dimensional matrix bar code; and the unique access path data comprises a Uniform Resource Locator (URL).

33. The ornamental organism tracking and information system of claim 18 wherein the visual information access device is included with an enclosure containing the specific ornamental organism or lot of ornamental organisms.

34. The ornamental organism tracking and information system of claim 18 wherein the specific ornamental organism or lot of ornamental organisms comprise a plant.

* * * * *